United States Patent [19]
Clune

[11] Patent Number: 5,884,374
[45] Date of Patent: Mar. 23, 1999

[54] FASTENER MEMBERS AND APPARATUS FOR THEIR FABRICATION

[75] Inventor: William Clune, Concord, N.H.

[73] Assignee: Velcro Industries B.V., Curacao, Netherlands

[21] Appl. No.: 974,474

[22] Filed: Nov. 20, 1997

[51] Int. Cl.$^6$ .................................................. A44B 18/00
[52] U.S. Cl. .............................................. 24/446; 24/452
[58] Field of Search .............................. 428/100; 24/442, 24/452, 446, 449, 450

[56] References Cited

U.S. PATENT DOCUMENTS

| | | |
|---|---|---|
| 2,717,437 | 9/1955 | De Mestral . |
| 3,083,737 | 4/1963 | De Mestral . |
| 3,094,330 | 6/1963 | Smith . |
| 3,136,026 | 6/1964 | De Mestral . |
| 3,214,816 | 11/1965 | Mathison . |
| 3,261,069 | 7/1966 | Mathison . |
| 3,266,841 | 8/1966 | Altman . |
| 3,312,583 | 4/1967 | Rochlis . |
| 3,372,444 | 3/1968 | Mathison . |
| 3,405,430 | 10/1968 | Sidelman . |
| 3,460,860 | 8/1969 | Stevens, Jr. . |
| 3,494,006 | 2/1970 | Brumlik . |
| 3,534,780 | 10/1970 | Hockmeyer et al. . |
| 3,546,754 | 12/1970 | Erb et al. . |
| 3,557,407 | 1/1971 | Lemelson . |
| 3,732,604 | 5/1973 | Erb . |
| 3,801,245 | 4/1974 | Erb . |
| 3,879,835 | 4/1975 | Brumlik . |
| 3,899,803 | 8/1975 | Brumlik . |
| 3,922,455 | 11/1975 | Brumlik . |
| 4,198,734 | 4/1980 | Brumlik . |
| 4,541,154 | 9/1985 | Ito et al. . |
| 4,709,453 | 12/1987 | Harvey et al. . |
| 4,775,310 | 10/1988 | Fischer . |
| 4,887,339 | 12/1989 | Bellanger . |
| 5,116,563 | 5/1992 | Thomas et al. . |
| 5,300,058 | 4/1994 | Goulait et al. . |
| 5,392,498 | 2/1995 | Goulait et al. . |
| 5,537,720 | 7/1996 | Takizawa et al. .......................... 24/452 |
| 5,565,255 | 10/1996 | Young et al. . |
| 5,586,979 | 12/1996 | Thomas . |
| 5,656,351 | 8/1997 | Donaruma ............................. 24/442 X |
| 5,685,050 | 11/1997 | Murasaki .............................. 24/452 X |
| 5,715,581 | 2/1998 | Akeno ...................................... 24/452 |

FOREIGN PATENT DOCUMENTS

| | | |
|---|---|---|
| 2929 329 A1 | 7/1979 | Germany . |
| 1022715 | 2/1964 | United Kingdom . |
| WO 94/29070 | 12/1994 | WIPO . |
| WO 95/01863 | 1/1995 | WIPO . |

*Primary Examiner*—James R. Brittain
*Attorney, Agent, or Firm*—Fish & Richardson P.C.

[57] ABSTRACT

A fastener for engaging loops includes a base with a field of fastener elements molded with and extending from the base. The fastener elements are constructed to engage loops of a mating loop component to form a releasable fastener. The fastener elements comprise hooks and spikes, interspersed among the hooks, which extend at an acute angle from the base. By arranging the hooks and spikes in differing directions on the base, increased shear strength is provided in corresponding directions. Molds and methods for forming the fastener are also disclosed.

21 Claims, 23 Drawing Sheets

$\alpha \approx 30° - 60°$ $\alpha \approx 30°\text{-}60°$

FASTENER MEMBERS AND APPARATUS FOR THEIR FABRICATION

BACKGROUND OF THE INVENTION

This invention relates to molded fastener members useful for engaging loops and the like.

In hook and loop fasteners, typically an extensive field of molded hooks aligned in adjacent rows on one half of the fastener, the "hook element", engages mating loops or anchored fibers on the other half of the fastener, the "loop element."

Fastener members of a molded hook element typically are integrally formed with the base, each including a stem extending from the base to a head with a crook which overhangs the base. Often the mold cavities in which the hooks are formed have no moving parts, the hook fastener elements being pulled from the mold cavities by resiliently distorting the solidified crook portions of the hooks. For molding a running strip of such a hook element, a rotating mold roll is employed. For discrete items, cyclable injection molding techniques are employed. Typically in either case, the mold is formed of a stacked series of plates, with the overhanging crooks of the hooks confined to face in the direction of the planes of the mold plates.

One characteristic of fastener components is the shear strength of engagement between them. This refers to their ability to resist disengagement when subjected to a force acting along the plane defined between the mating faces of the hook and loop elements. The shear strength often determines the strength limit of the attachment. In many applications, the fastener is applied with the hook elements aligned to face in a first direction, but the shear load applied to the fastener component is in a direction that is perpendicular to, or at a substantial angle to, the direction in which the hooks face. For example, hook fastener components in some disposable diapers face in a direction generally parallel to a baby's waistline, yet the forces on the fastener caused by motion of the baby's legs are substantially perpendicular to the waistline.

SUMMARY OF THE INVENTION

The present invention features a fastener for engaging loops, which includes a base and a field of fastener elements molded with and extending from the base. The fastener elements are constructed to engage loops of a mating loop component to form a releasable fastener and include hooks which define crooks for capturing loops. Spikes are interspersed among the hooks and extend at an acute angle from the base to at least the height of the crooks above the base. The fastener elements are arranged in rows, with a first set of rows comprising hooks and a second set of rows comprising spikes.

In accordance with another feature of the invention, the hooks extend in a first direction along the base, and the spikes extend in a second direction along the base.

In accordance with another feature of the invention, the fastener has spikes with an engagement tip for capturing loops extending at an acute angle from the base. Latch stems are located on the base adjacent to the spikes and beneath the engagement tip to cooperate with the spike to capture the loops.

In accordance with another feature of the invention, the fastener has pairs of adjacently opposed structures on the base. The pairs include a first structure and a second structure with an engagement tip for capturing loops. The engagement tip has a first position located above the first structure, and a second position located beneath the first structure.

In accordance with another feature of the present invention, there is provided a mold for producing a fastener. The mold includes a set of mold plates which have hook mold plates and spike mold plates. The hook mold plates have hook mold surfaces for producing hooks which are molded with and extend from a base. The hooks define crooks for capturing loops of a mating loop component. The spike mold plates have spike mold surfaces for producing spikes which extend at an acute angle from the base.

In accordance with another feature of the present invention, there is provided a method for forming a loop engaging fastener. The method includes providing a mold for the fastener which has a set of mold plates. Hook mold plates with hook mold surfaces for producing hooks are provided, along with spike mold plates having spike mold surfaces for producing spikes. Moldable resin is delivered to the mold such that the resin is forced into the mold surfaces, where it is solidified into hooks and spikes which are then removed from the mold.

DESCRIPTION OF PRESENTLY PREFERRED EMBODIMENTS

Figure 1:
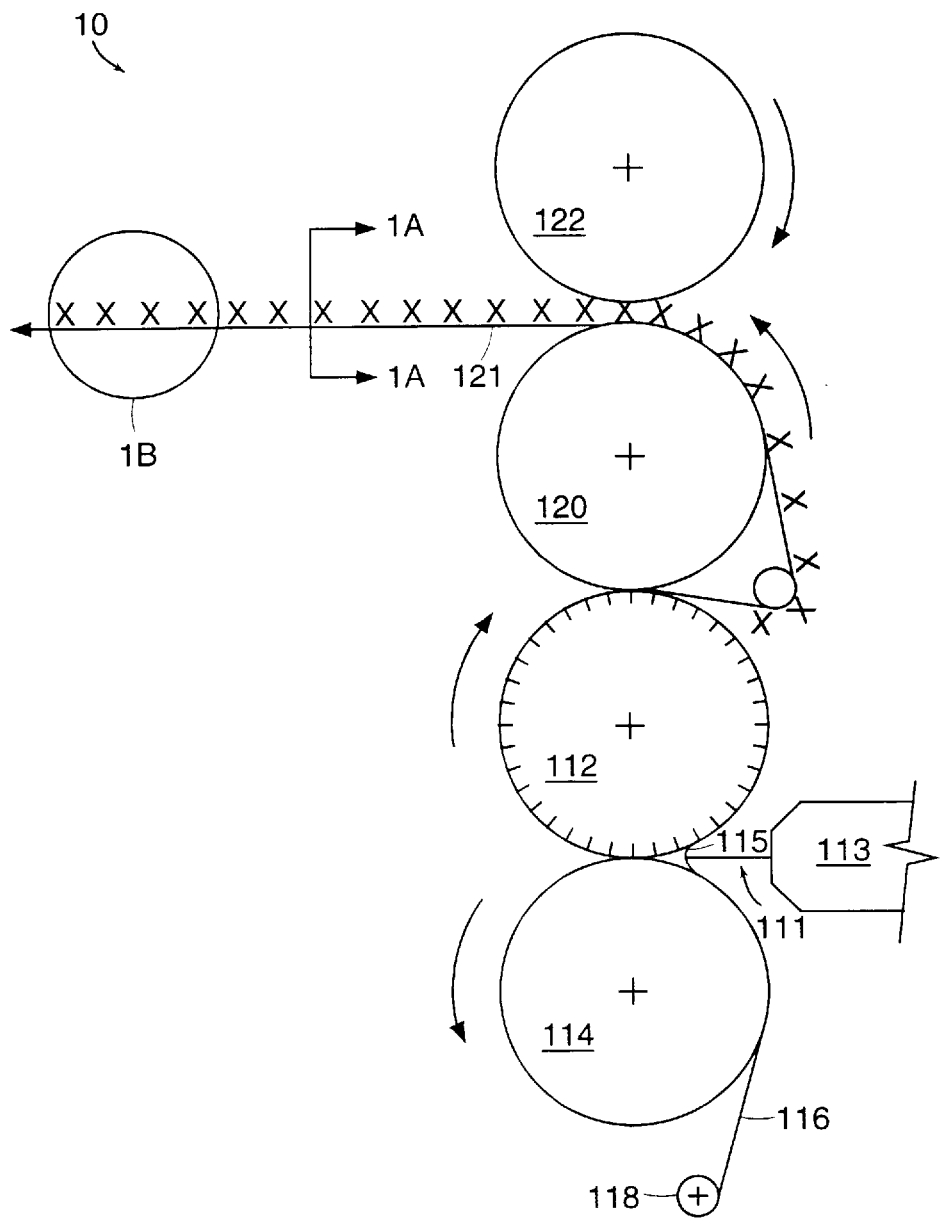
FIG. 1 illustrates a process for molding a loop engaging fastener.

Referring to FIG. 1, a loop-engaging fastener component 10 in the form of a continuous strip is molded in a continuous process using principles of the Fischer process U.S. Pat. No. 4,794,028, for example.

Fastener components with combined arrangements of hook and spike elements are molded by use of a set of stacked parallel plates in which edge formations in selected plates define the hook fastener elements and holes extending inwardly from the exposed edge surface of selected plates provide cavities for molding the spike elements. The angles of the axes of the holes relative to the surface of the roll are selectable for the desired application. The combination of fastener elements enables the fastener component 10 to provide loop engaging shear strength in selected directions depending upon the selected orientation of the respective elements.

Using a continuous process, mold cavities for rows of hook fastener elements and spike elements are formed in the peripheries of corresponding disk-form mold plates of a mold roll. Molten resin is continuously extruded and applied with pressure against the cooled mold roll which has mold cavities about its periphery that are configured to produce fastener elements, as described. In one form of the Fischer process, as shown in FIG. 1, the molten resin from extruder 113 is continuously extruded into a nip formed between cooled mold roll 112 and pressure roll 114. A supply bank 115 of molten resin is thus formed which, under pressure of the nip, is forced into the hook and spike cavities and also between the rolls, to form a sheet-form base that is integral with the molded fastener formations. After cooling while on the roll, the continuous sheet form fastener component or tape is stripped from the mold roll.

When desired to make the height of the molded fastener elements more uniform or otherwise to reconfigure the molded elements, the molded tape 121 is passed between a wrap-around roller 120 and a knock-down roller 122 while the fastener elements are still soft and permanently deformable. Roller 122 pushes any higher elements down to a uniform, desired pre-established height. In other instances the knock-down roller is heated to a level sufficient to enable it to reform, by thermoforming, the engaged portion of the molded elements to provide further characteristics to the end product. As suggested by the components illustrated in dashed lines, in some instances a sheet 116, such as a woven or non-woven fabric, is supplied from a roll 118 to the nip, such that the resulting hook component includes fastener elements which are intimately joined to sheet 116 in what is termed an in situ laminating process. This sheet contains loops adapted to serve as a loop component to engage the fastener elements.

In an adaptation of the Fischer process, an extruder nozzle extrudes resin under pressure against the roll surface, with extensions of the nozzle surface that conform to roll 112 serving to keep the extruded resin at sufficient pressure to fill mold cavities 110 with resin. In another example, the moldable resin is delivered to mold roll 112 and, after traveling along the surface of the mold roll, the resin is pressed into the mold cavities using a pressure roller.

Moldable resin may also be injected into mold cavities to form the fastener elements by injection molding, to either form the fastener elements as discrete devices, or on a rigid backing constructed to be attached to a separate product. Injection molding is also employed to form the hook and spike fastener elements integrally with a product being molded, such that the fastener elements do not need to be subsequently attached to the product.

In some instances stems and spikes are integrally molded with a base and subsequently deformed to complete the formation of loop-engageable fastener elements.

The moldable resin may be any suitable plastic material depending on the intended fastener application. Currently, polypropylene is preferred. Nylon, polyesters, polyethylene, propylene, ethylene and copolymers thereof, as well as other thermoplastic and thermosetting resins may also be readily employed.

Figure 1A:
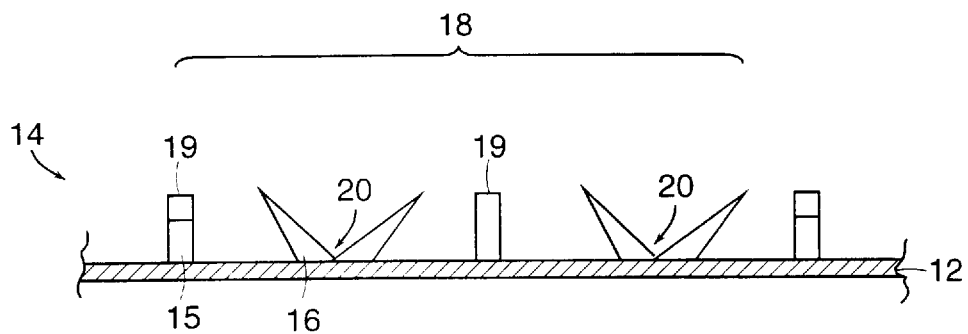
FIG. 1A illustrates a loop engaging fastener taken along line 1A—1A of FIG. 1.

Referring to FIG. 1A, there is shown a molded fastener for engaging loops viewed along line 1A—1A of FIG. 1. The fastener comprises a base 12 and a field of fastener elements 14 molded with and extending from the base 12. The fastener elements are constructed and formed in such a manner as herein described to engage loops of a mating loop component to form a releasable fastener. The field of fastener elements 14 includes hook fastener elements 15 defining crooks 17 for capturing loops which are located at a given height C above the base 12. Spikes 16 are interspersed among the hooks 15 and extend at an acute angle from the base 12 to at least the height C of the crooks 17 above the base.

Figure 1B:
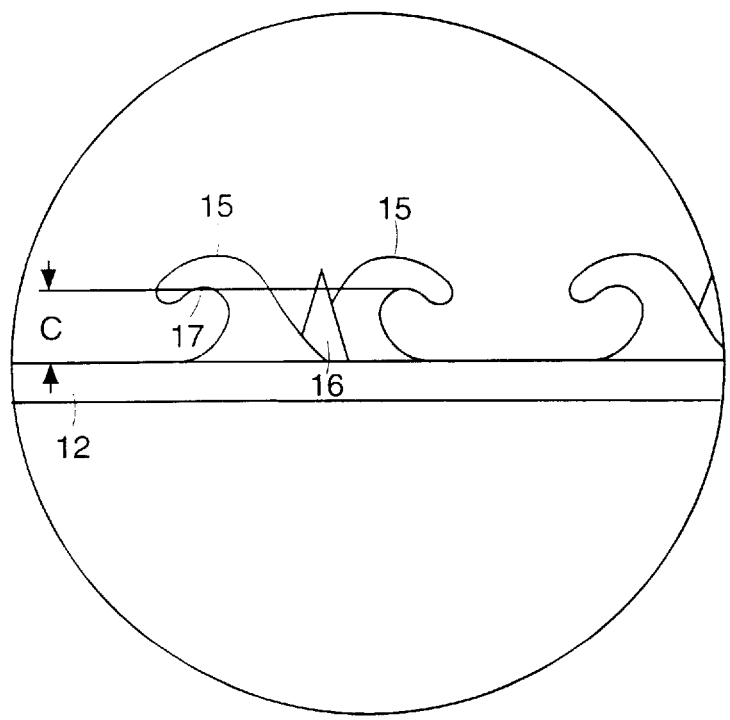
FIG. 1B is an enlarged side view of isolated area 1B of FIG. 1.
Figure 5:
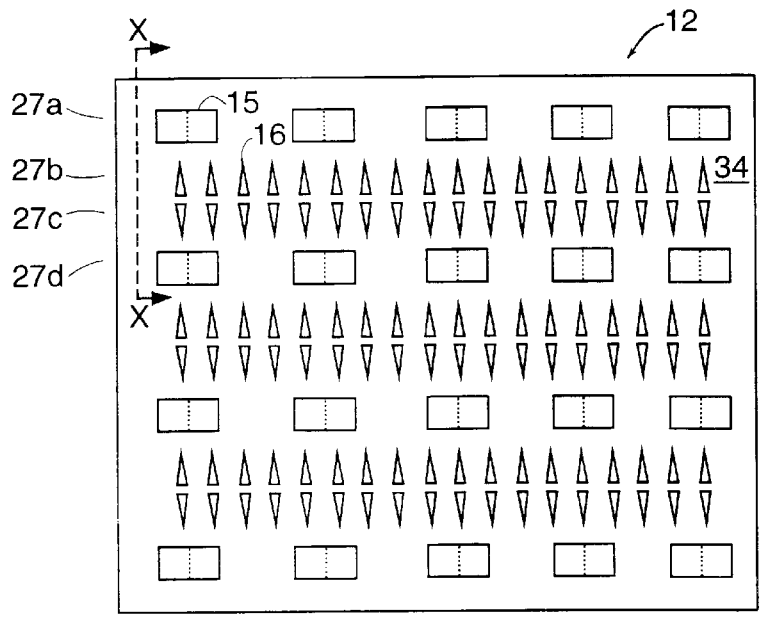
FIG. 5 illustrates a plan view of the loop engaging fastener.

As can be seen in FIGS. 1A, 1B, and 5, the hook fastener elements 15 and spike fastener elements 16 are arranged to face in differing directions along the base 12. The fastener elements of each type lie in longitudinal rows 18 extending in the machine direction with a first set of rows 19 of hook fastener elements 15 interleaved with a second set of rows 20 of spike fastener elements 16. The individual hook fastener elements 15 of rows 19 extend in a first direction along the base 12 and the individual spike fastener elements 16 of rows 20 extend in a second direction along the base 12, thereby defining between the first and second directions an angle of at least 10 degrees, and preferably approximately 90 degrees.

Figure 2A:
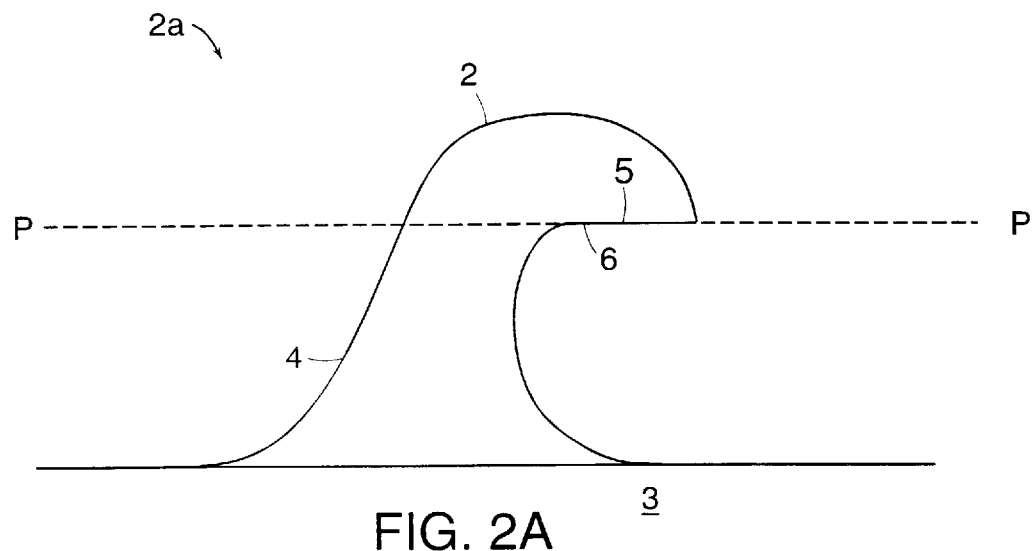
FIG. 2A illustrates a hook element.
Figure 2B:
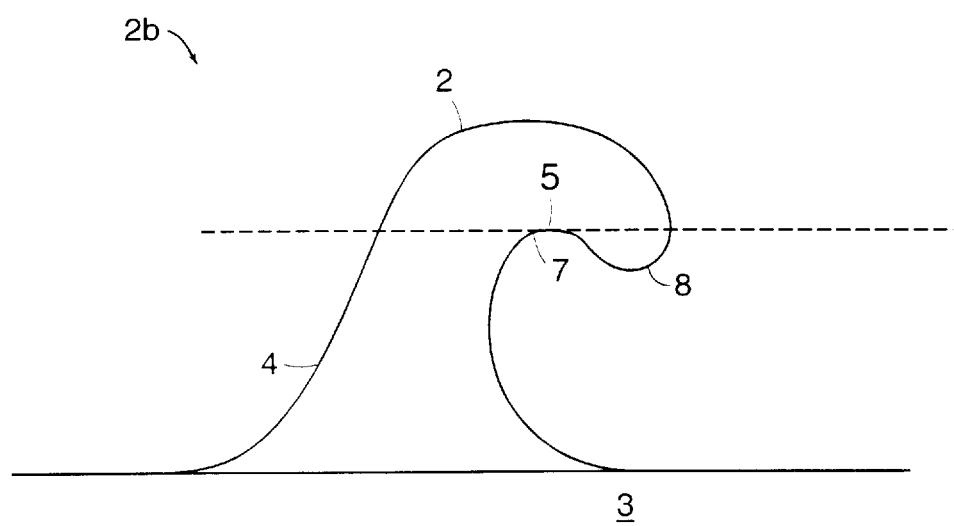
FIG. 2B illustrates a re-entrant hook element.

Referring to FIG. 2A, the term "hook" describes elements 2a with a head 2 which overhangs a base 3 from a stem 4 and which has a crook 5 for capturing loops. A "crook" is defined by the lower surface 6 of the head 2 which is tangent to a plane (P—P) parallel to the base 3. As shown in FIG. 2B, one type of hook is a re-entrant hook 2b. The term "re-entrant" means that the crook 5 defines a loop capturing area 7 enclosed on one side by the engagement tip 8 and on another side by the stem 4 of the hook 2b. A "spike" is distinguished from a "hook" because a spike does not have a lower surface which is tangent to a plane parallel to the base.

Figure 3A:
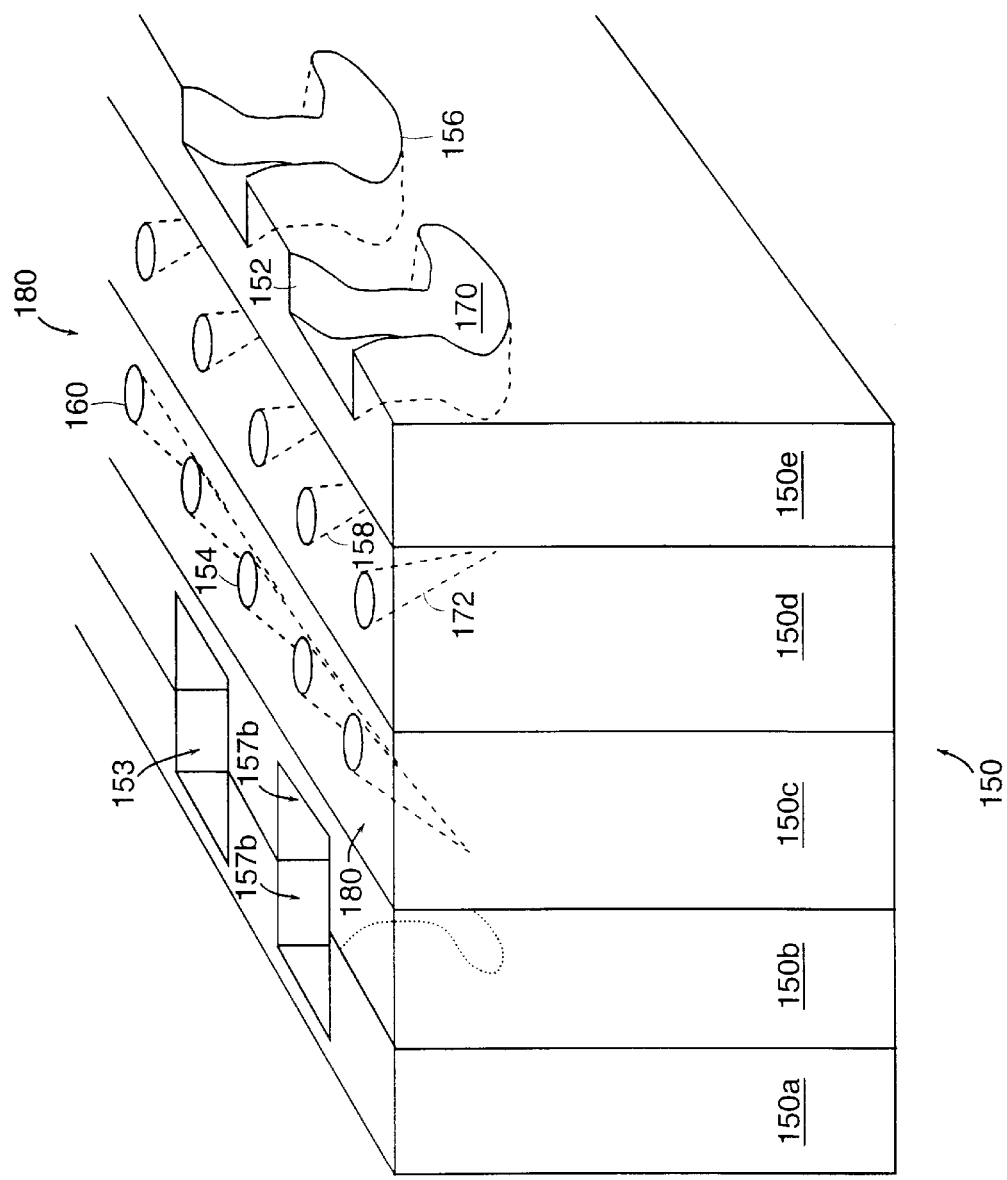
FIG. 3A illustrates the molding plates which are used to form the hook and spike fastening elements.

FIG. 3A shows a set of mold plates 150a–e for producing the molded fastener. The mold plates 150 have first and second types of mold surfaces 152 and 154 which define first and second types of cavities 156 and 158, respectively, for producing hook and spike fastener elements. Any hook design is useful in combination with the spikes. Preferably, mold plates 150a, 150b and 150e each have half-hook formations 170 which are used to create the crook shape of the hook fasteners. A pair of mold plates, such as 150a and 150b, cooperate to form entire hook cavity 153 from the combination of their respective half-hook cavities 157a and 157b. In this manner, it can be seen that a pair of mold plates such as 150a and 150b create a single row of hook fasteners on the molded base 12. Hook cavities 156 are readily formed by any of the traditional methods known in the art, such as laser machining, electro-discharge machining, drilling, milling, through-cutting, or photo-chemical etching.

Spike mold plates 150c and 150d each have a configuration of mold surfaces 154 which define spike-form cavities 158. It is preferred that spike form cavities 158 be elongated and approximately conical with an oblong cross-section in a plane parallel to the surface 180 with a major axis perpendicular to the rows of cavities to provide good spike bending strength in this cross-machine plane. Cavities 158 extend into the surface 180 of mold plates 150c or 150d at an angle of approximately 30 to 60 degrees.

Figure 3B:
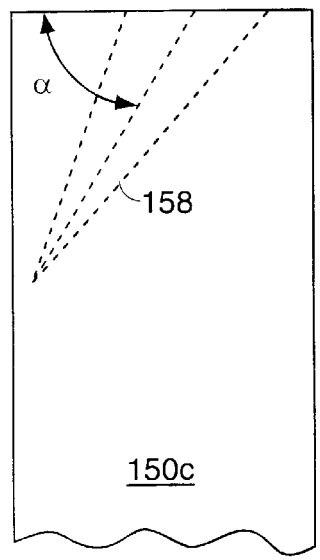
FIGS. 3B–3D are end, side, and top views respectively of a portion of a spike-molding plate.
Figure 3C:
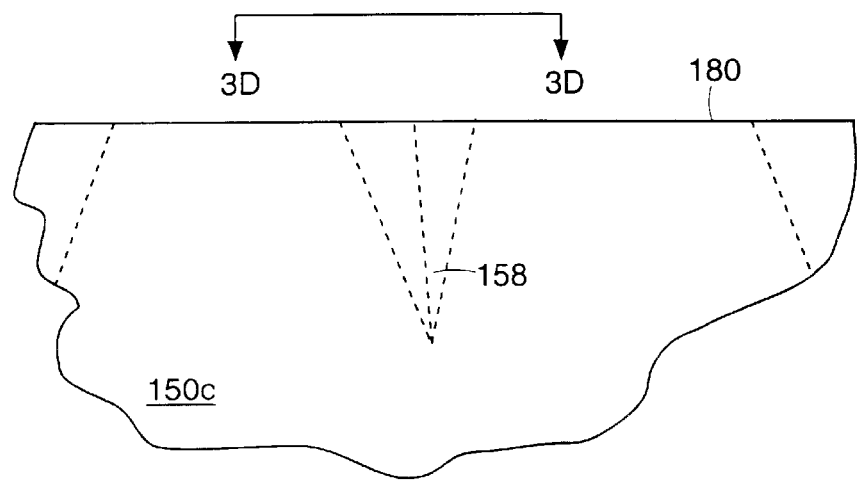
Figure 3D:
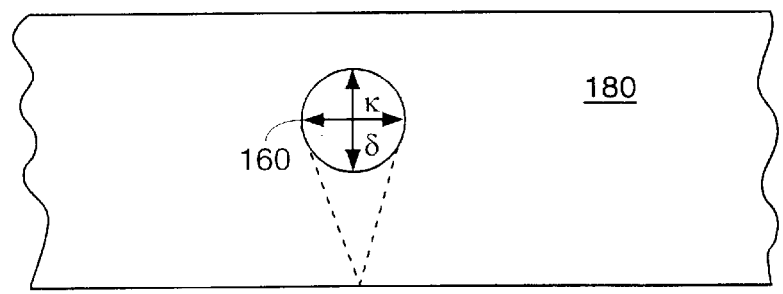

Referring to FIGS. 3B, 3C and 3D, end, side and top views respectively of spike mold plate 150c are shown in isolation. The cavity 158 extends into the surface 180 of the mold plates 150 at an angle α. The oblong opening 160 of the cavity has a major axis 'j' and minor axis 'k.' By designing the mold 150 so that spike-forming cavities 158 extend in a direction which is non-parallel to the hook mold cavity 156, hybrid fastener elements with good cross-machine loading capabilities and shear strength are produced.

In one example, cavities 158 have elliptical openings 160 of approximately 0.010 inch along their major axes, j and approximately 0.007 inch along their minor axes, k. From the opening, the cavity 158 extends approximately 0.020 inches into mold 150.

The spike-forming cavities 158 can be formed by a variety of methods, such as laser machining, electro-discharge machining, or drilling with a shaped bit. In order to create spike cavities 158 in an individual mold plate 150c, the mold plate 150c is placed on an indexer which is then set at a desired angle to the direction of the chosen forming tool. The plate 150c is then drilled through by the tool to a predetermined depth to produce cavities 158. By drilling at an angle, this tends to produce an elliptical opening 160 at the surface 180 of the mold plate. Once an individual cavity is formed, the mold plate is indexed to the next desired cavity location and the forming process is repeated.

Electro-discharge machining (EDM) is an alternative method of forming the cavities 158. With EDM, an arc is formed between the electrode of the tool and the metal surface 180 of the mold plate 150c. The arc heats the metal and the electrode advances into the metal surface to form a cavity of desired depth. Preferably, the electrode has a diameter smaller than the desired cross-section of a cavity 158, since metal surrounding the electrode will vaporize during the process.

Figure 3E:
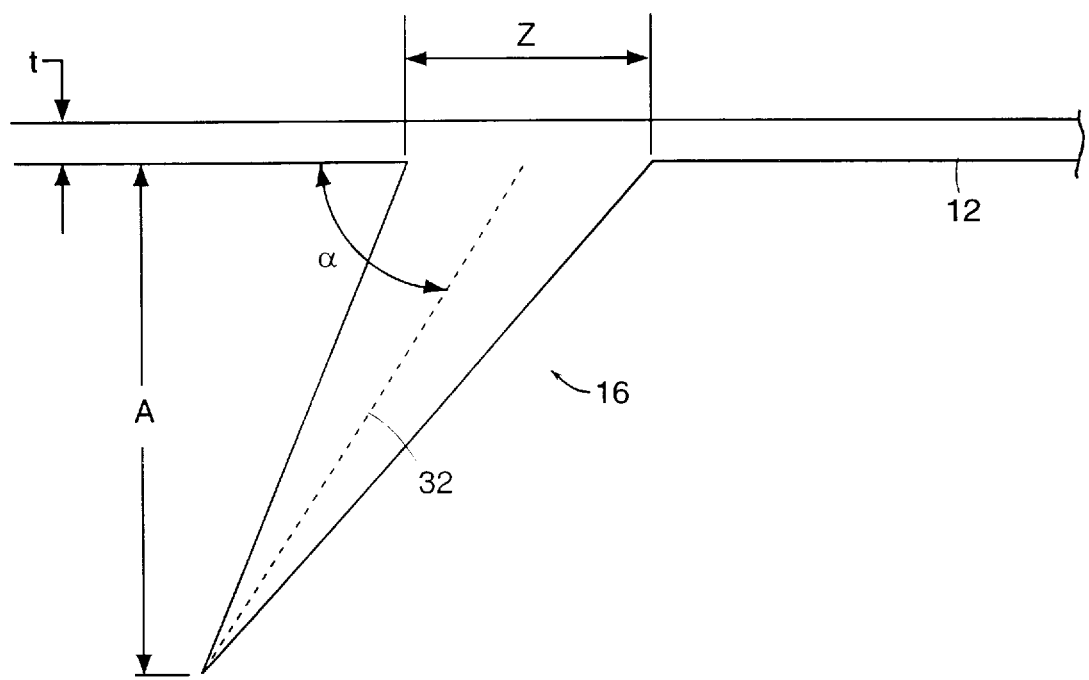
FIG. 3E illustrates a spike fastening element molded from the mold plates of FIGS. 3A–3D.

FIG. 3E illustrates a resulting integrally molded spike fastener element which has been removed from cavity 158 after formation. The spike fastener element 16 generally has the shape of cavity 158 of FIG. 3A, forming an angle α, between the center axis 32 of the spike 16 and the base 12 of thickness 't'. The spike 16 has a spike foundation of width Z.

Figure 4:
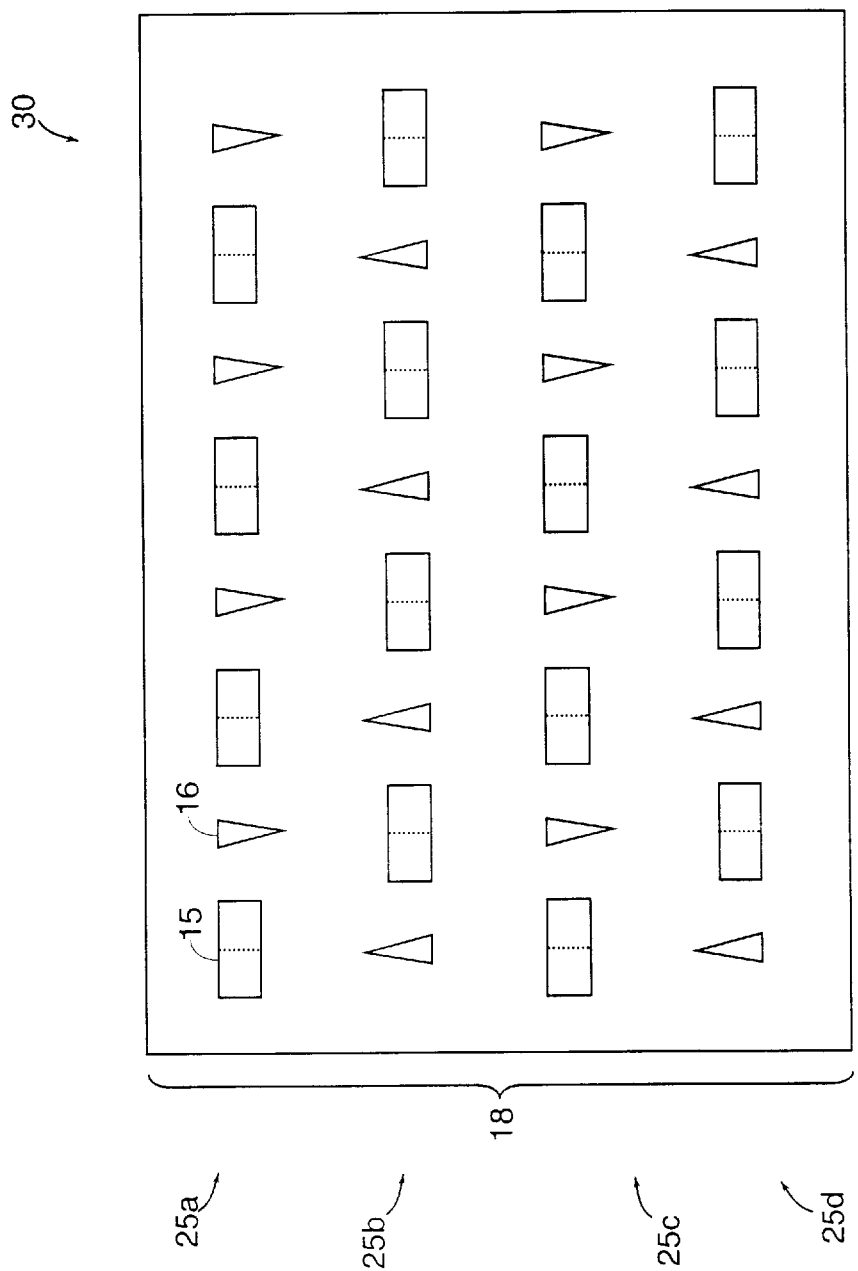
FIG. 4 illustrates a plan view of an alternative embodiment of the loop engaging fastener.

In FIG. 4, in an alternative embodiment 30, the hybrid fastener includes a series of parallel rows 18 where some of the rows include more than one type of fastening element. For example, row 25a in FIG. 4 includes a hook fastener element 15 adjacent to a spike fastener element 16.

The hybrid fastener 10 is described with reference to the plan view of FIG. 5, and the end view of FIGS. 6 and 7 where the fastener element is viewed along line X—X of FIG. 5. In these views, the thin, flexible base 12 is shown with hook fasteners 15 and spike fasteners 16 extending from a common surface 34 of the base 12. As shown in FIG. 7, the hook fastening element 15 extends to engage a corresponding woven mating component 42 through individual loops 44. It is preferable to have the hook fastener element 15 extend in a first direction to engage a loop 44 of the mating component 42 and the spike fastener element 16 extend in a second direction in non-parallel relation to the first direction to engage the loop 46 of a mating component 42. It is preferred that spike fastener 16 extends in substantial perpendicular relation to the hook fastener 15 in order to maximize cross-machine direction engagement and shear strength.

Figure 6:
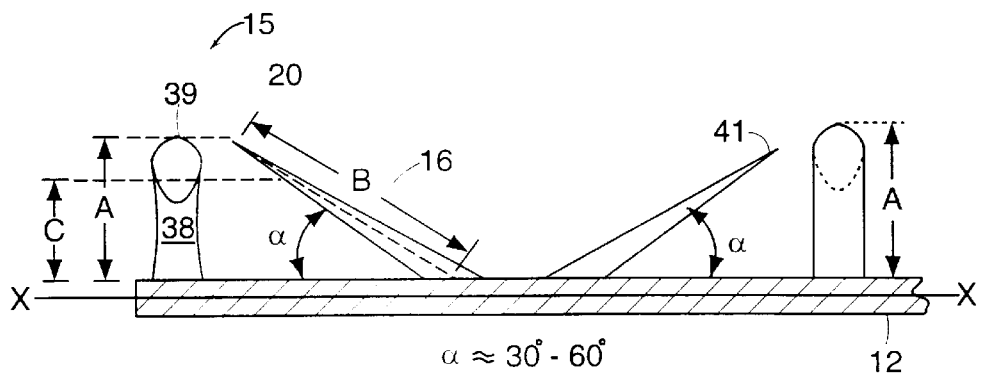
FIG. 6 is a cross-sectional view taken along line X—X of FIG. 5.
Figure 7:
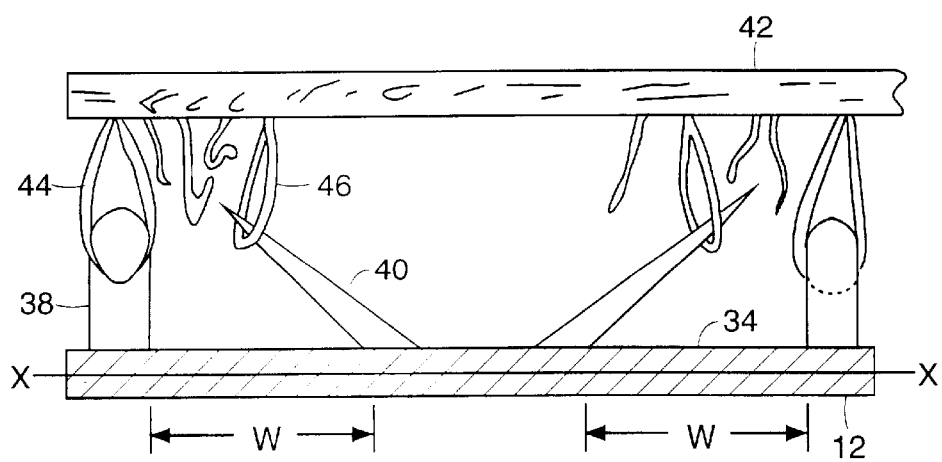
FIG. 7 illustrates a fastener component engaging a mating component.

In FIGS. 6 and 7, hook and spike forms of fastener elements are shown as an individual hook formation 38 and an individual spike formation 40. Individual hook 38 has a height of distance A from the surface 34 of base member 12 to the top 39 of the hook 38 and a height of C from surface 34 to the crook 17. Preferably, the spike fastener 16 extends from a foundation at the base surface 34 at an acute angle to conclude with a distal tip 41. The spike fastener 16 preferably extends from the surface 34 at an angle α of 30 to 60 degrees and at a length B so that the distal tip 41 is at a height from the surface 34 of at least C and preferably at a height of approximate equal distance from the surface 34 as the height A of the hook fastener 15.

In this manner, when mating component 42 engages with base 12, individual loops and fibers 44 and 46 of the woven mating component 42 are engaged by the combination and multitude of fastener elements on a given base 12. Since the fastener elements 15 and 16 are of different varieties, and preferably in different angular relationship to each other, the number of overall engagements with loops or fibers, 44 or 46, and the directions of the engagements increases. By having a multitude of multi-directional engagements, the shear strength of the fastener-mating component interconnection is increased. This creates a stronger bond between the mating component 42 and the base 12 which is less subject to disengagement when forces are applied to the fastener 10 in a direction which is not parallel to the direction of the plane of the molding plates.

The base 12 of the present invention 10 is made from a variety of materials and in a variety of methods. Among the many materials which are used for the base 12 include plastics, films, woven materials, metals, composites, etc. Preferably, the base member is of a thin, flexible material, such as a thin plastic film.

Figure 8:
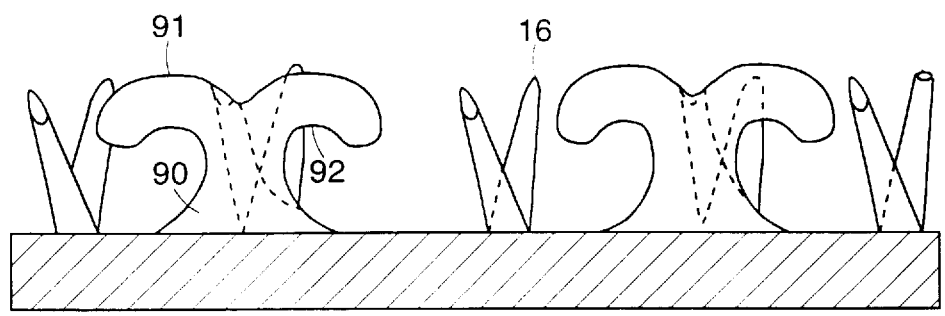
FIG. 8 illustrates a side view of a hook formation.

Referring to FIG. 8, there is shown a side view of a two directional hook formation which is used with the present invention. Preferably, the hook formation is integrally formed with the base 12 and includes a stem 90 standing up from the base 12 and concludes with a head 91 which defines a multiple loop capturing crook 92 for capturing loops. The crook 92 is attached to the stem 90 and preferably curves back towards the base 12.

While only a few rows of fastener elements are shown in FIG. 5, this is to be understood as for illustration purposes only and that loop engaging fastener 10 may have any number of rows. The fastener elements in alternative parallel rows 27a and 27d may face in opposite directions. Alternatively, the hook fastener element may face in the same direction or have other orientations. Fastener elements of the hook type 15 preferably have a thickness of about 0.030 inches, and adjacent parallel rows of fastener elements 27a and 27b are separated by a distance W of about 1.5 times the thickness of a hook fastener. Adjacent hook fastener elements in the same row are preferably spaced along the row at a distance of 2–5 times the thickness of one of the hook fastener elements, such that the head of a hook fastener element will not contact a back surface of a second adjacent element in the same row when the stem of a given element is deflected downward by a vertical load. In a preferred embodiment, there are about 10–30 hook fastener elements 15 per lineal inch in each row.

Preferably, adjacent rows 27b and 27c of spike formations 16 are separated by a distance of about 0.005 inch to 0.050 inch. Adjacent spike formations 16 within a row are preferably spaced along the row at a distance of 0.5 to 1 times the base width Z of one of the spike formations 40, so that preferably the spike formations 16 outnumber the hook formations 15. In a preferred embodiment there are about 10 to 100 spike formations 16 per lineal inch in a uniform row of spike fastener elements 16.

Figure 9:
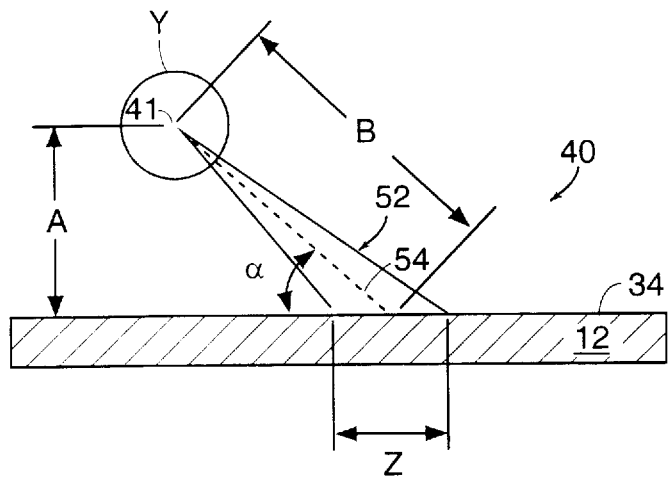
FIG. 9 illustrates an individual spike fastening element.
Figure 10:
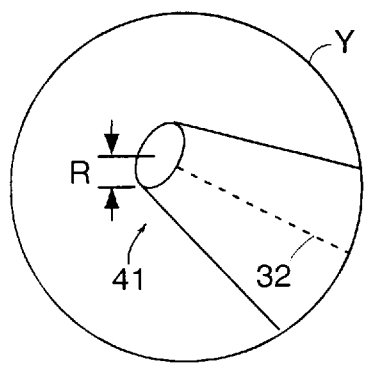
FIG. 10 illustrates an enlarged view of isolated area Y of FIG. 9.
Figure 11:
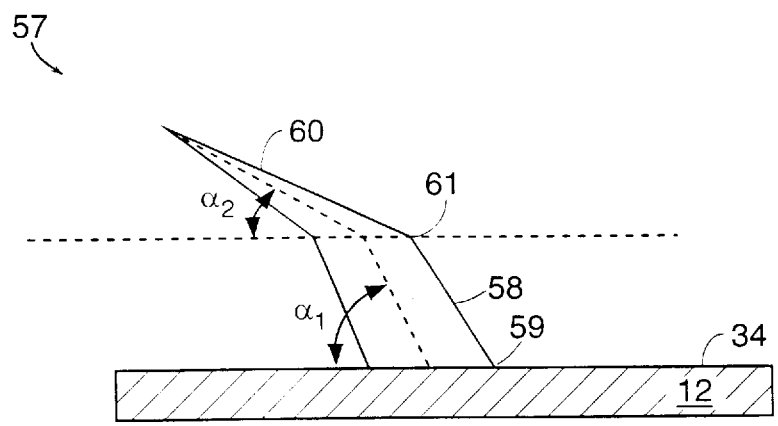
FIG. 11 illustrates an alternative design for the spike fastening element.

Referring now to FIGS. 9–11, various possible embodiments of the spike formations 16 are shown. In FIG. 9, an individual spike 40, which is integrally formed to base 12, has a foundation 54 on the surface 34 of the base 12. From the foundation 54, a stem 52 extends a distance of B and at an angle of α in relation to the surface 34 of the base 12 and the central axis 32 of the spike 40. The stem 52 concludes with a distal tip 41 which has a radius of R. FIG. 10 is an expanded view of area Y of FIG. 9 which illustrates the tip radius and hence "sharpness" of the spike 40 of approximately 0.002 inch to 0.020 inch. The tip radius is preferably between 20 and 50 percent of the width of the foundation 54. In a preferred embodiment, the spike 40 tapers from a radius of 0.002 inch at the tip 41 to a radius of approximately 0.005 inch at the spike foundation 54 over a stem length of approximately 0.020 inches with an angle of α between approximately 30 to 60 degrees.

FIG. 11 shows another embodiment of the spike formation 16 of the present invention 10. In this embodiment, the individual spike 40 is a bent spike 57 which has a base portion 58 integrally molded with and extending from the base 12 at a first angle $\alpha_1$ between the center axis of the spike 40 and the surface 34 of the base 12. The base portion 58 extends to a distal end 61. Further, the bent spike 57 has a tip portion 60 integrally molded with and extending from the distal end 61 of the base portion 58. Preferably, the tip portion 60 extends at a second angle $\alpha_2$, in relation to the surface 34 and the center axis of the tip portion 60.

Figure 12:
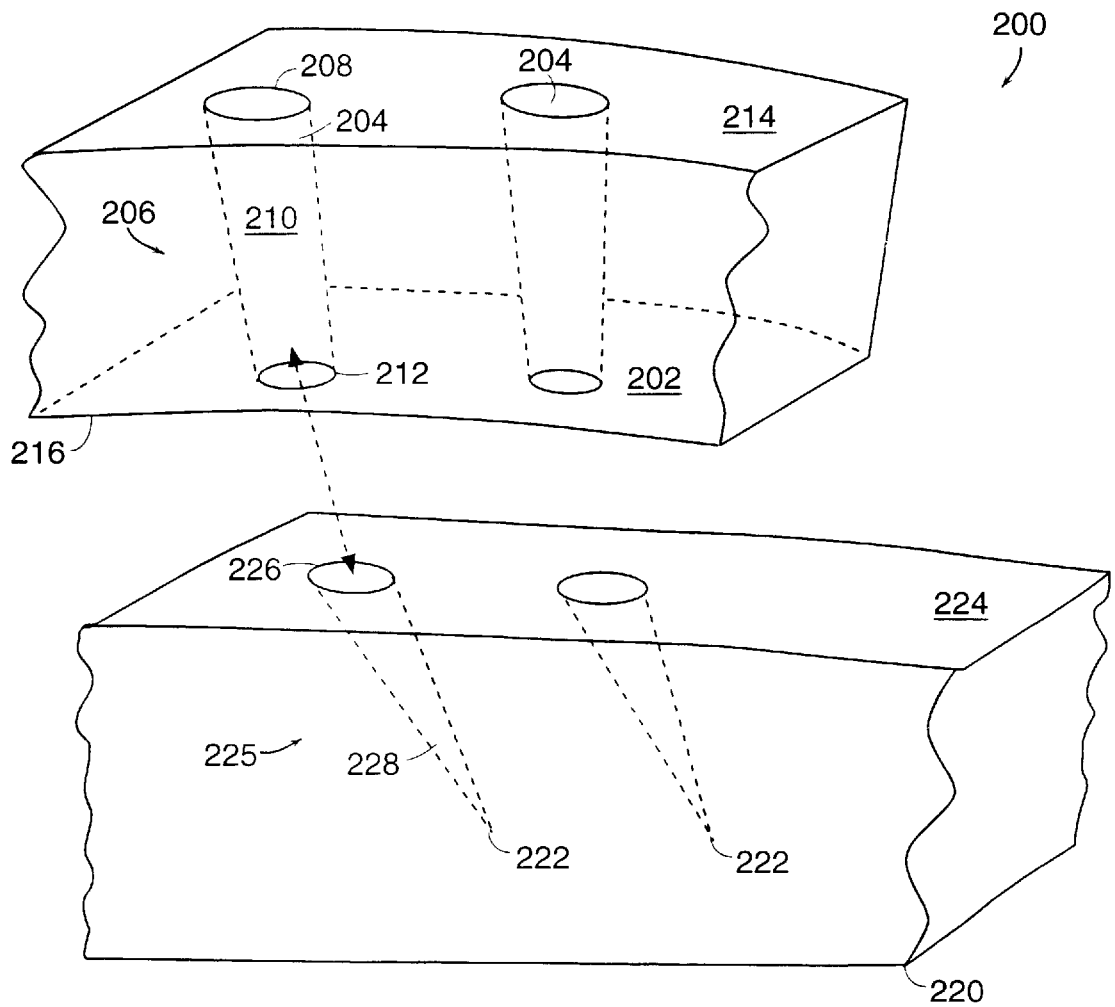
FIG. 12 illustrates the molding plates which are used to form the cross machine fastening element of FIG. 11.

Referring to FIGS. 11 and 12, the methods of manufacturing bent spike formations 57 are described in detail. In one method, bent spike formations 57 are formed by a pair of molding rings 200 which are stacked on top of each other. A first molding ring 202 has a first set of mold cavities 204 extending through the first mold ring 202 at a first angle $\alpha_1$. An individual base portion mold cavity 206 includes an opening 208 located on a first surface 214, a channel 210, and a second opening 212 located on a second surface 216. The spike base portion mold cavity 206 is formed in the first molding ring 202 through various methods known in the art and previously described herein, such as laser machining, drills, or electro-discharge machining. By injecting the desired material into the mold cavity 206, the base portion 58 of bent spike formation 57 is created.

The first mold ring 202 is placed above a second mold ring 220 to integrally mold a tip portion 60 with a spike base portion 58. The second mold ring 220 has a second set of mold cavities 222 which are aligned with the first set of mold cavities 204 of the first molding ring 202. An individual mold cavity 225 of the second mold ring 220 has an opening 226 located on one surface 224 and cavity section 228 extending into the second mold plate 220 at second angle $\alpha_2$. opening 226 aligns with opening 212 of spike base mold cavity 206, thereby allowing material to flow from the spike base mold cavity 206 into the tip portion mold cavity 225 to form the integrally connected tip portion 60 of the bent spike formation 57. Cavities 222 of the second mold ring 220 are formed by methods previously described herein.

Figure 13A:
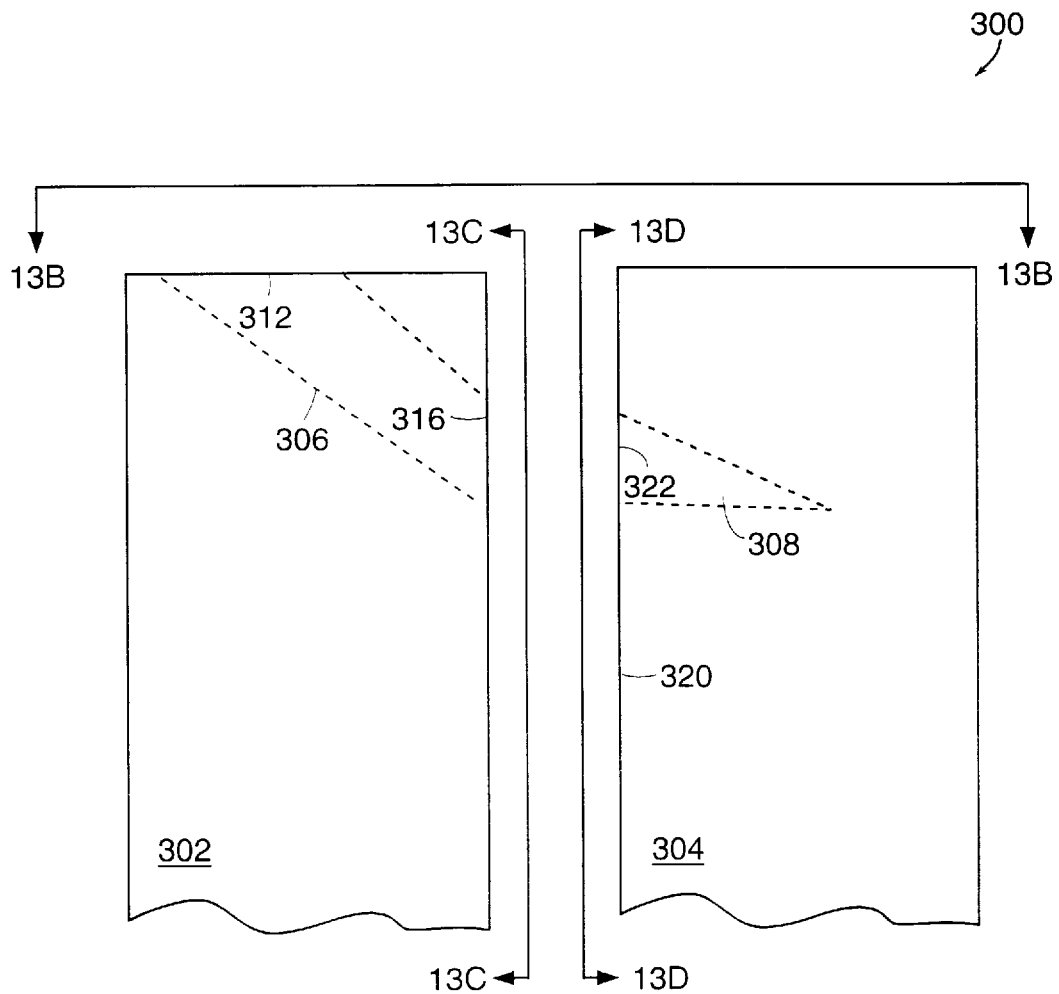
FIGS. 13A–13D illustrate end, top, and side views of an alternative molding plate design to form the spike fastening element of FIG. 11.

In FIGS. 13A–13D, a second method of forming bent spike formations 57 by the use of side-by-side molding plates 300 is shown. In FIG. 13A, end views of a spike base portion molding plate 302 and a tip portion molding plate 304 illustrate the spike base mold surface 306 and the tip mold surface 308 for integrally molding a bent spike element 57. These side-by-side plates 300 can be utilized with the Fischer process, described earlier herein.

Figure 13B:
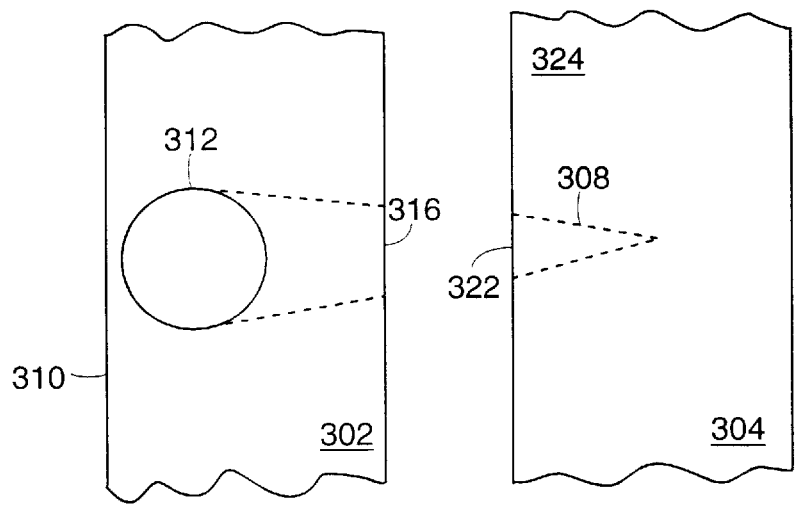

Referring to FIG. 13B, which is a top view of molding plates 300 along line 310—310 of FIG. 13A, spike base portion molding plate 302 has a top surface 310 with an opening 312 defined by mold surface 306. The mold surface 306 extends from the opening 312 at an angle to the side surface 314 of spike base molding plate 302, thereby forming a channel within the plate.

Figures 13C, 13D:
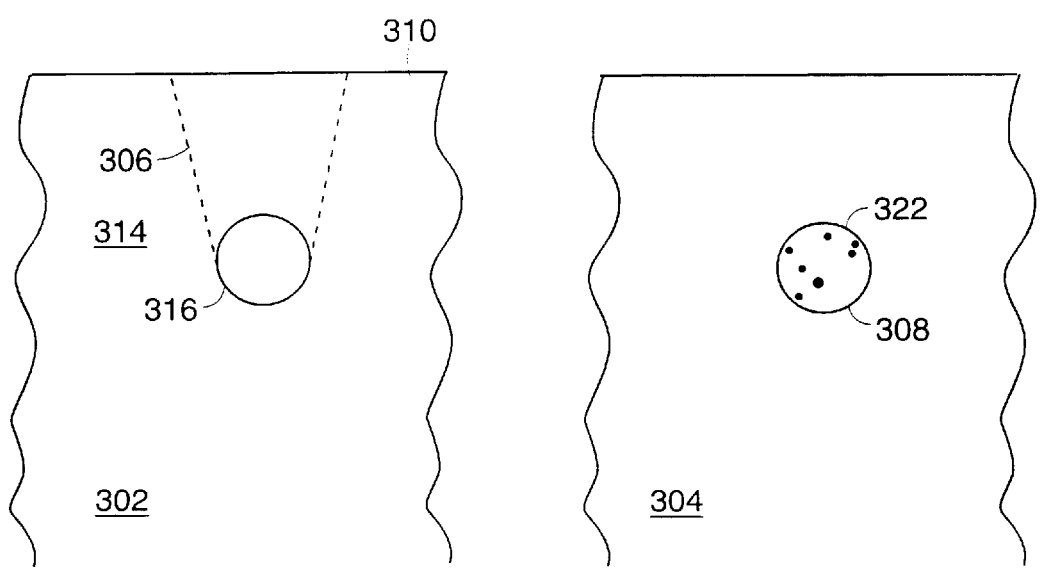

Viewing the plate 302 along line 13C—13C of FIG. 13A, the side surface 314 and side opening 316 are shown in FIG. 13C. From the side opening 316, molten resin flows into the tip portion molding plate 304 during application of the Fischer process. The tip portion molding plate 304 has an opening 322 on side surface 320. From the opening 322, the tip portion mold surface 308 extends into the tip mold plate 304. This is illustrated by the end view of the mold plate in FIG. 13A and the side view of the mold plate in FIG. 13D taken along line 13D—13D of FIG. 13A.

Fastener elements on the base can include pairs of adjacently opposed structures. The pairs include a first structure having an engagement tip for capturing loops and a second structure located at least partially beneath the engagement tip. The first and second structures cooperate to capture loops of a mating component. These fastener elements include "latch-type" and "snap-latch" fasteners.

Figure 14A:
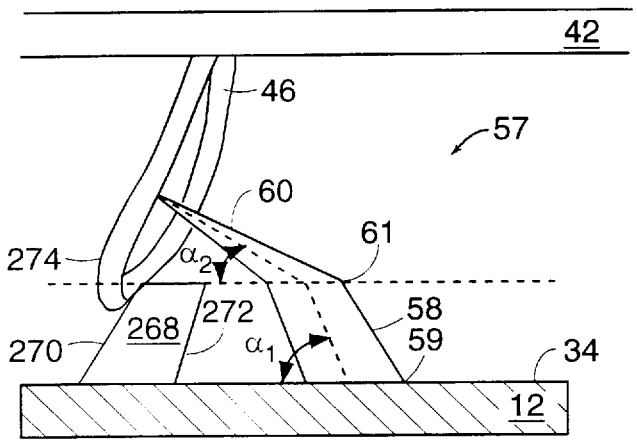
FIGS. 14A–14C illustrates a latch type fastener element.
Figure 17:
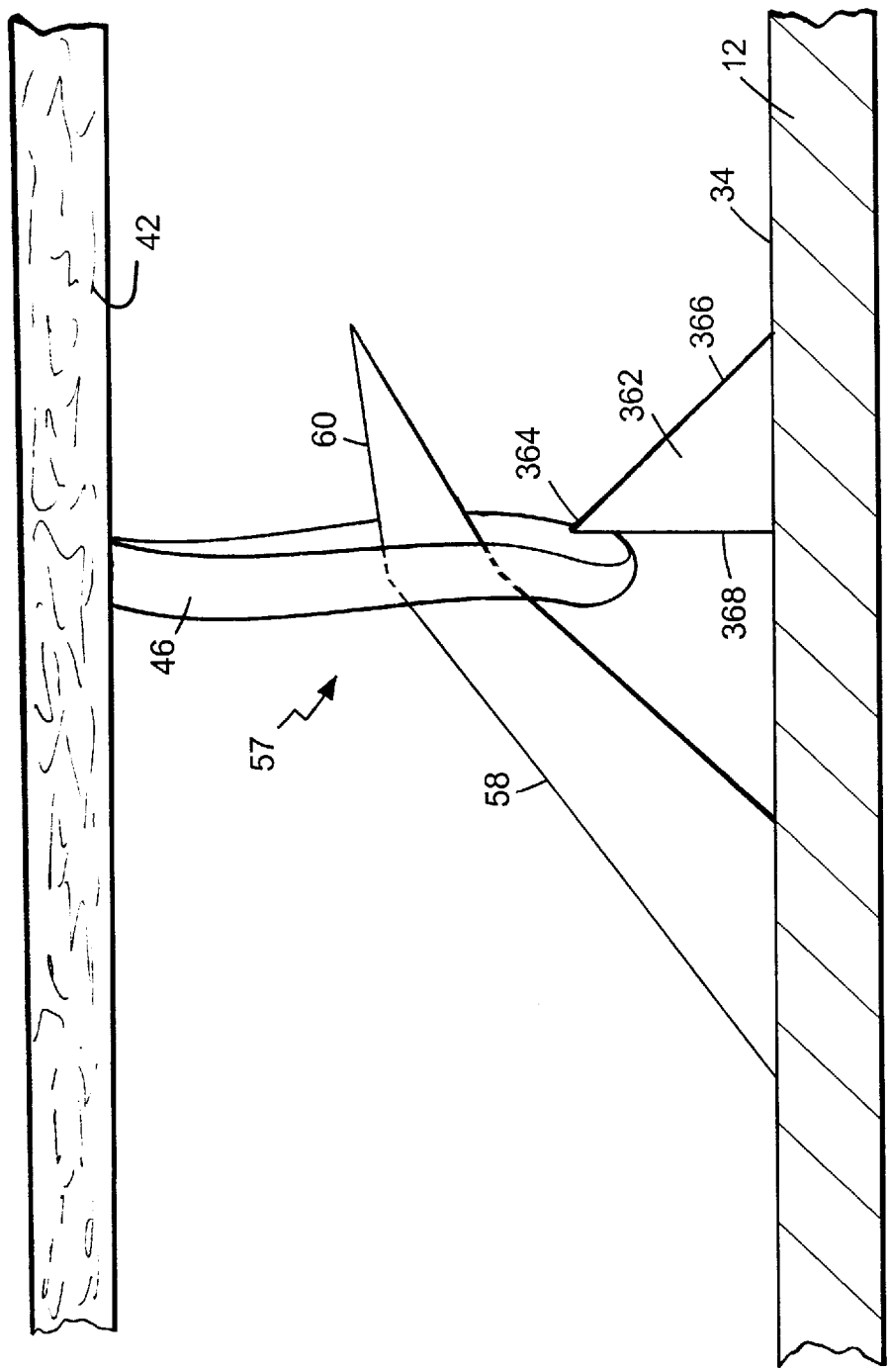
FIG. 17 illustrates a latch type fastener formed from the molding ate of FIG. 16.

Referring to FIGS. 14A—14C, and 17, there are shown "latch type" fastener elements which can be used in combination with hook fasteners. As seen in FIG. 14A, the spike fastener of FIG. 9 or FIG. 11 is formed adjacent to and with its engagement tip 60 located above a shorter latch stem 268, which also extends from the base 12. The latch stem 268 creates a stronger disengagement force and higher peel strength by the spike fastener for removal of a loop 46 of a woven fastener 42. The latch stem 268 preferably includes an outer surface 270 which is sloped toward the engagement tip 60 of the spike 57. The sloped outer surface 270 assists in directing a loop 46 to be captured by the spike 57 as the loop 46 contacts the sloped surface 270. The loop 46 is biased away from the spike 57 at the loop apex 274 by the stem 268, and toward the spike 57 at its opening 276. The spike stem 268 preferably has a straight or inwardly sloped surface 272 which "traps" or "latches" a loop 46 once the loop 46 slides between the engagement tip 60 and the stem 268. This is illustrated in FIG. 17, where a loop 46 has been captured by engagement tip 60 of a spike fastener 57 and has slid down the spike beyond a latch stem 362. The loop 46 becomes trapped by the spike 57 and inner surface 368 of latch stem 362. In this manner, the disengagement force required to release loop 46 is increased over the force necessary for engagement, as the latch stem 362, latch stem tip 364, and inner surface 368 prevent the loop 46 from easily sliding off of spike 57. Latch stems 362 have a height of preferably one half the height of the spike fastener and are preferably located from spike fasteners 1 to 1.5 times the base width Z of a spike fastener 57. Other possible shapes and designs for latch stems 362 can include, but are not limited to, hooks and spikes.

Figure 14B:
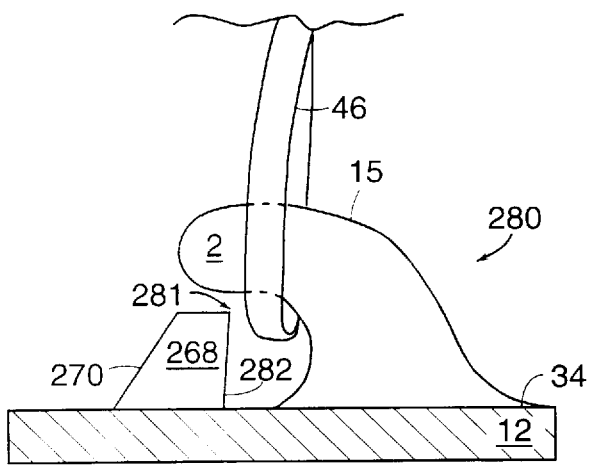

FIG. 14B illustrates another embodiment of a pair of opposing structures 280 extending from a base 12 which cooperate to capture a loop 46 of a mating component. The first structure is a hook 15 and the second, opposing structure is a latch stem 268, positioned adjacent to the hook 15 and at least partially beneath its head 2. The latch stem 268 illustrated in FIG. 14B includes a sloped surface 270 exterior to the loop capturing area 281 between the pair of opposing structures 280. The loop capturing area 281 is defined by hook 15, base 12, and inner surface 282 of latch stem 268. Further, the inner surface 282 of the latch stem 268 is perpendicular to the base 34 in this illustration, although other angular relationships between surface 282 and base 12 are possible.

Figure 14C:
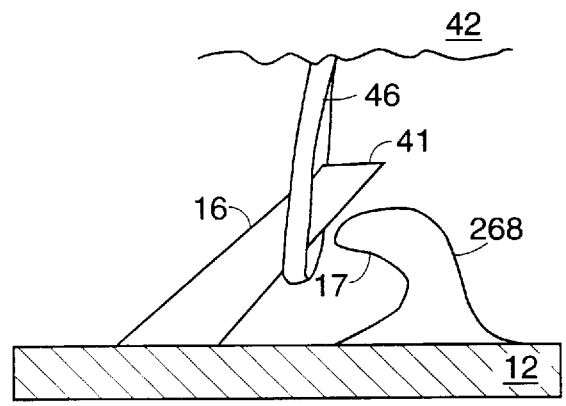

FIG. 14C illustrates an embodiment where the pair of opposing structures includes a spike 16 with a distal end 41 and a hook shaped latch stem 268 located adjacent to spike 16. Latch stem 268 has its crook 17 facing the spike 16 and positioned at least partially beneath distal end 41. Together, spike 16 and latch stem 268 cooperate to capture a loop 46 and increase the disengagement force required for loop 46 to become "untrapped". When an attempt is made to disengage loop 46 from spike 16, loop 46 is captured by hook latch stem 268. Release of the loop 46 from the spike 16 and latch stem 268 is accomplished only by the application of sufficient forces at proper angles. These forces and angles vary according to the distance between the adjacent opposing structures, 16 and 268, as well as the deformation of the materials and shapes involved.

Figure 15:
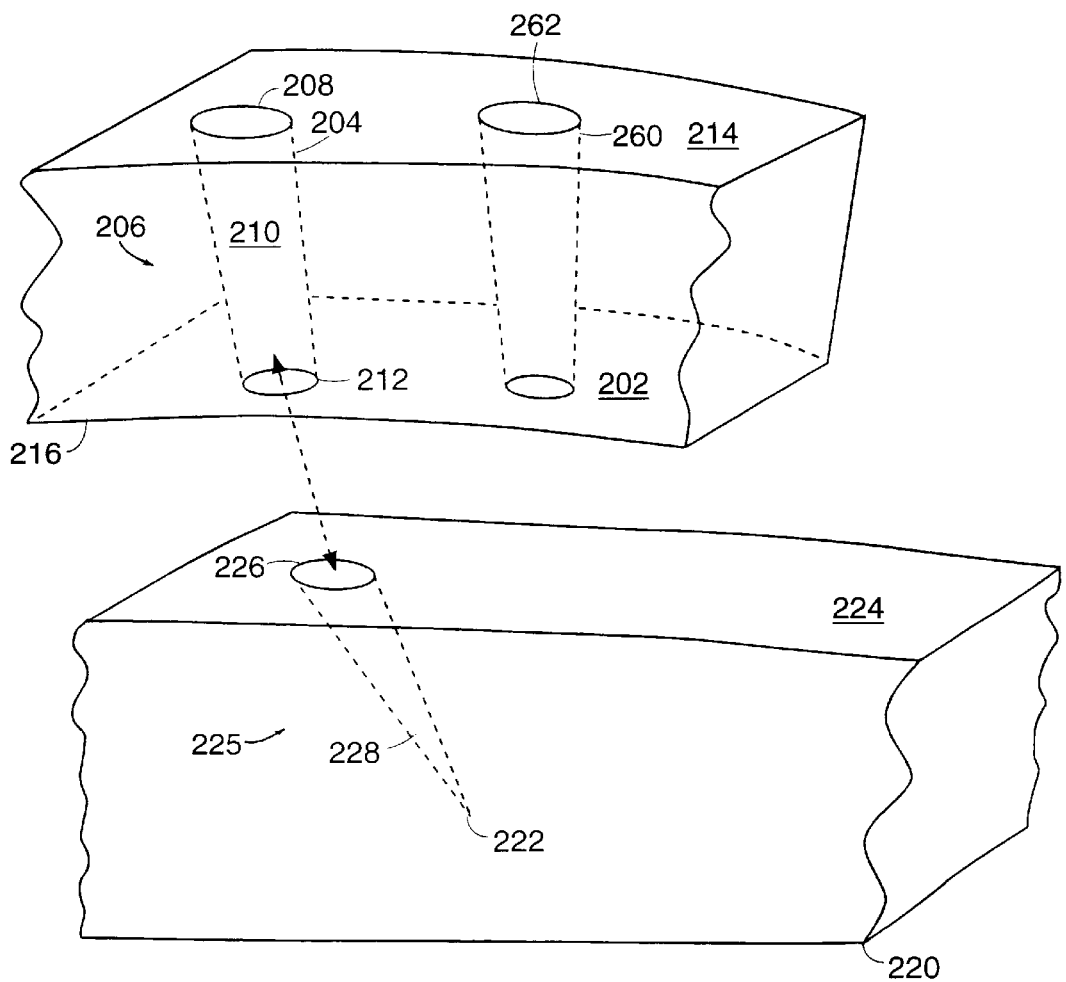
FIG. 15 illustrates molding plates which are used to form latch type fasteners.
Figure 16:
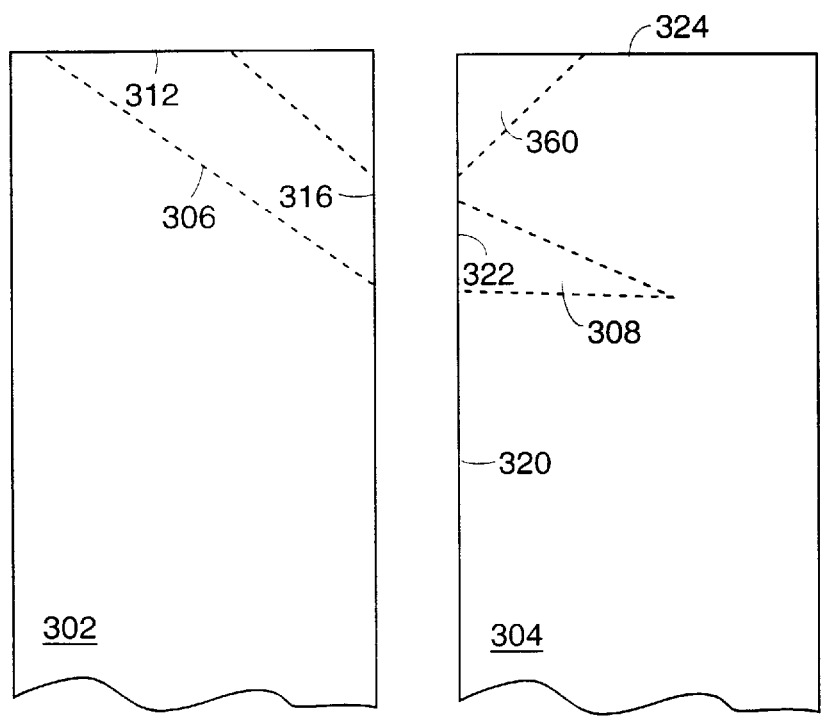
FIG. 16 illustrates an alternative molding plate design to form latch type fasteners.

Latch type fasteners of FIG. 14A are formed by modifying the design of the stacked ring molds of FIG. 12 as seen in FIG. 15. The top ring 202 can include a mold surface 260 which extends from an opening 262 substantially into the ring 202 and adjacent to spike cavity 206. Similarly, as shown in FIG. 16, a latch type fastener can be formed by modifying the side-by-side mold plates of FIG. 13. In this design, an angled mold surface 360 can be formed in mold plate 304 adjacent to spike mold surface 306 to create a latch stem 362. The mold surface 360 is easily accessible for cleaning purposes. This forms the latch type fastener illustrated in FIG. 17.

Figure 14D:
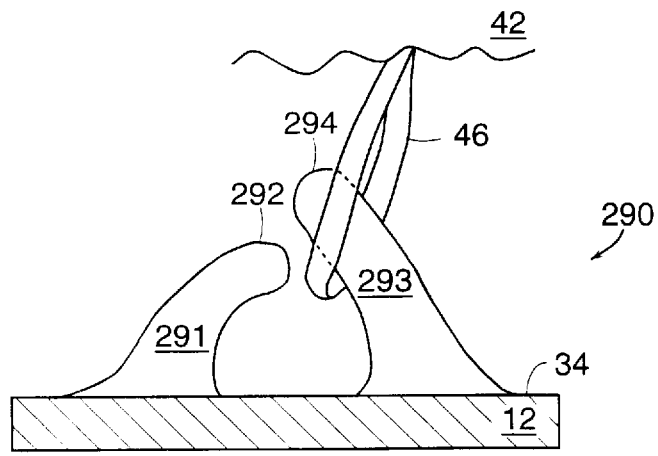
FIGS. 14D–14E illustrate a snap-type fastener.
Figure 14E:
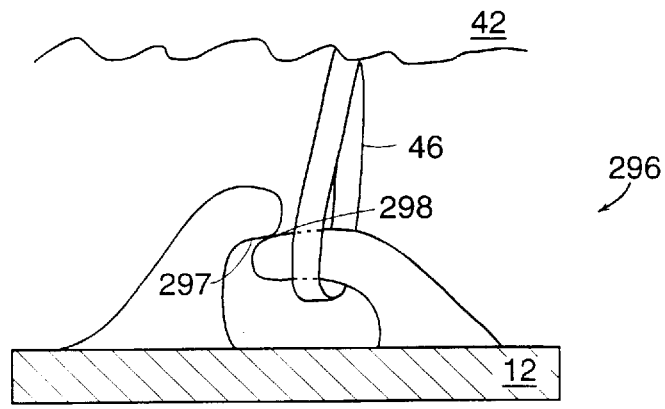

Referring to FIGS. 14D and 14E, there are shown snap type fastener elements for use with the present invention. Snap fastener elements include pairs of adjacently opposed structures 291 and 293 which extend from base 12. These pairs of structures cooperate to capture loops 46 of mating fastener components and increase the disengagement force required to remove loop 46 from the fastener combination of elements 291 and 293. These snap fasteners have a first position shown in FIG. 14D where individual fasteners 291 and 293 are not in contact with each other. In this open position 290, the fastener 291 and 293 receives or disengages a loop 46. The first structure 291 extends from base 12 and concludes with a tip 292. First structure 291 can be any shape which is capable of receiving a second element 293, with such shapes including hooks, spikes, and latch stem elements already described herein. The second structure 293 extends from base 12 and concludes with tip 294, which extends a height above the surface 34 of base 12 greater than the height of tip 292 above base 12. In this manner, the tip 294 of second structure 293 is in a position to receive a loop 46 of a mating component during contact of base fastener 12 with mating fastener 42. As a force is applied to base 12 and mating fastener 42, the engagement force bends the second structure 293 with loop 46 to be captured by first structure 291. The second structure 293 is locked into place beneath first structure 291 by deflecting the engagement tip 294 of second structure 293 downward into a second position beneath first structure 291. This is illustrated in FIG. 14E where the engagement tip 294 of second structure 293 snaps into a second position 296 beneath first structure 291. The lower surface 297 of first structure 291 creates a locking surface with the outer surface 298 of the second structure 293 to form a "closed" fastener. Loop 46 is, therefore, captured by the interlocked first and second structures 291 and 293 so that the loop 46 does not slide off or disengage from individual fastener 293.

The captured loop 46 is released from the closed or engaged position of 296 of FIG. 14E when forces are applied to the fastener elements to pull the second structure 293 back to its original open position of FIG. 14D. Once the combination is snapped open, the loop 46 is capable of sliding off and disengaging from second structure 293. Snap-latch fasteners of this type give higher peel strength and require higher disengagement forces to remove loops 46 and fastener 42 from the locked position. Snap-fasteners are used in a variety of situations where high peel strength is a desired feature, such as ceiling tiles, picture frames, and other high strength applications.

Figure 18:
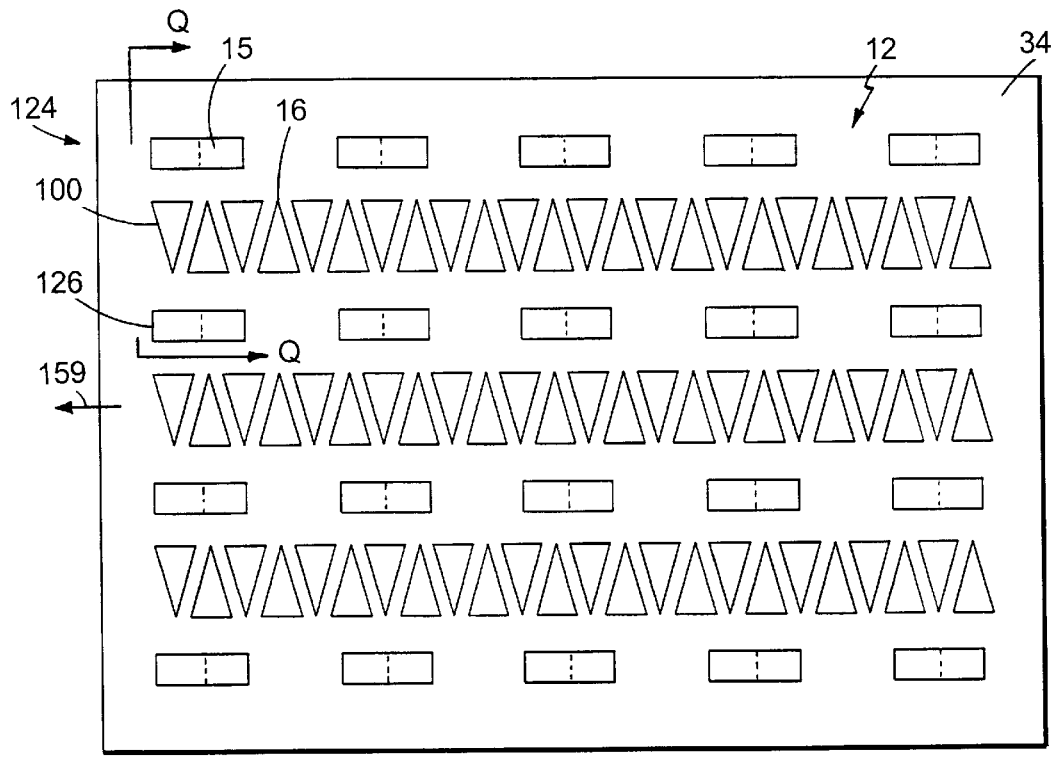
FIG. 18 illustrates a plan view of an alternative arrangement of spike fasteners in combination with hook fasteners.
Figure 19:
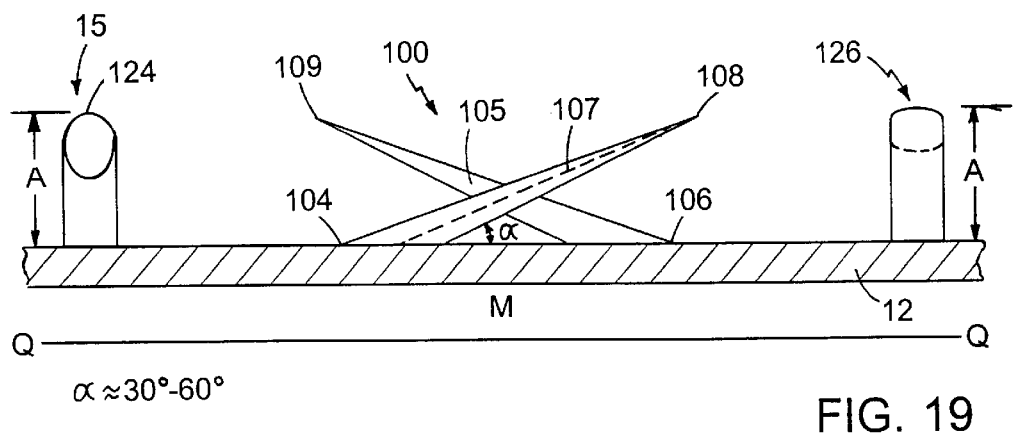
FIG. 19 illustrates an end view of an alternative arrangement taken along line Q—Q of FIG. 18.

Referring to FIGS. 18 and 19, there are shown plan and end views, respectively, of an alternative arrangement of the spike fastener elements 16 in combination with hook fasteners. In this embodiment, row 100 of spike fastener elements 16 has adjacent individual fastener elements, such as 104 and 106, which extend from the base 12 in opposite directions. With M serving as a midpoint between two adjacent rows of hook fasteners 124 and 126 it is shown that spike fastener 104 has an elongated stem 107 and distal tip 108 which extends from the base 12, toward row 126 of hook fasteners and away from row 124 of hook fasteners.

Conversely, spike fastener 106 has an elongated stem 105 and distal tip 109 which extends in the opposite direction from base 12 as spike fastener 104. The engagement tip 109 points toward row 124 of hook fasteners and away from row 126 of hook fasteners. Preferably, the adjacent spike fasteners 104 and 106 have elongated stems 107 and 105, respectively, crisscrossing each other to form an "X-configuration" of spike fasteners when viewed along line Q—Q of FIG. 18.

Figure 20:
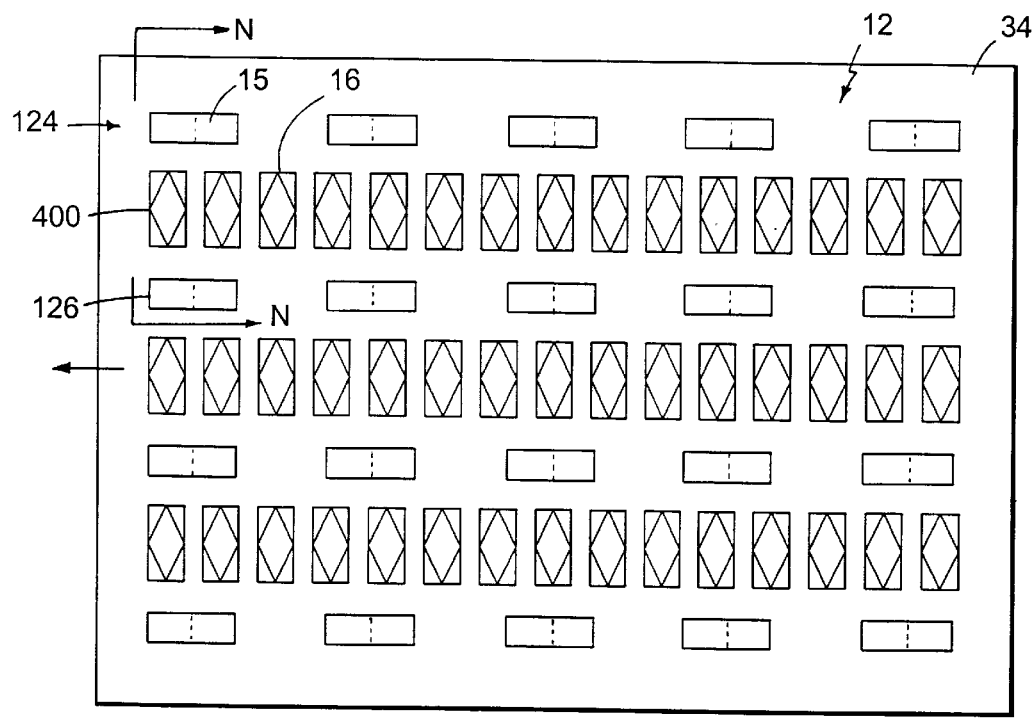
FIG. 20 illustrates a plan view of an alternative spike fastener in combination with hook fasteners.
Figure 21:
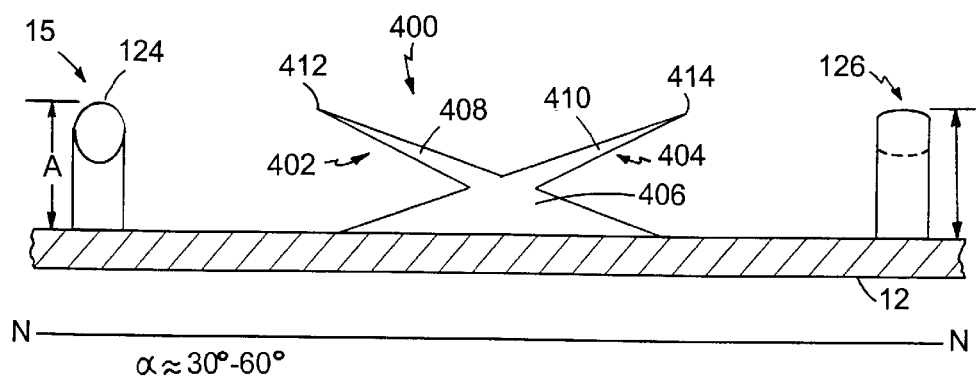
FIG. 21 illustrates an end view of the alternative spike fastener taken along line N—N of FIG. 20.

Referring to FIGS. 20 and 21, there are shown plan and end views, respectively of an alternative arrangement of crisscrossed spike fasteners in combination with hook fasteners 15. In this embodiment, row 400 of spike fastener elements 16 are formed from individual fasteners having two or more spikes 402 and 404 which extend from a common base 406. As seen in FIG. 21, which is a view along line N—N of FIG. 20, spike 402 has an elongated end 408 with distal tip 412 extending toward row 124 of hook fasteners 15. Likewise, spike 404 has an elongated end 410 with distal tip 414 extending in the opposite direction of spike 402 and toward row 126 of hook fasteners 15.

Figure 22A:
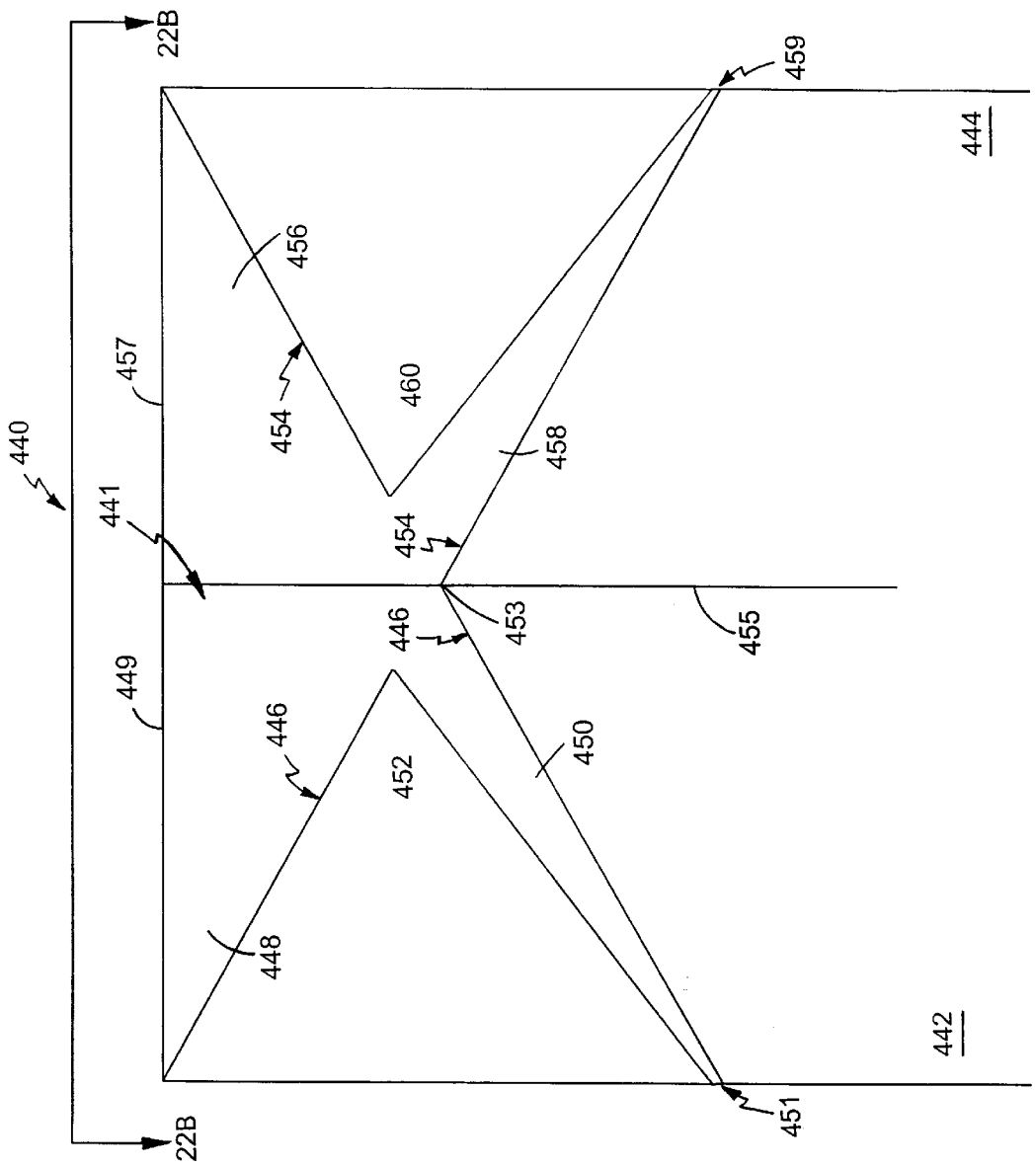
FIGS. 22A–22B illustrates end and top views of molding plate designs to form the spike element of FIG. 21.
Figure 22B:
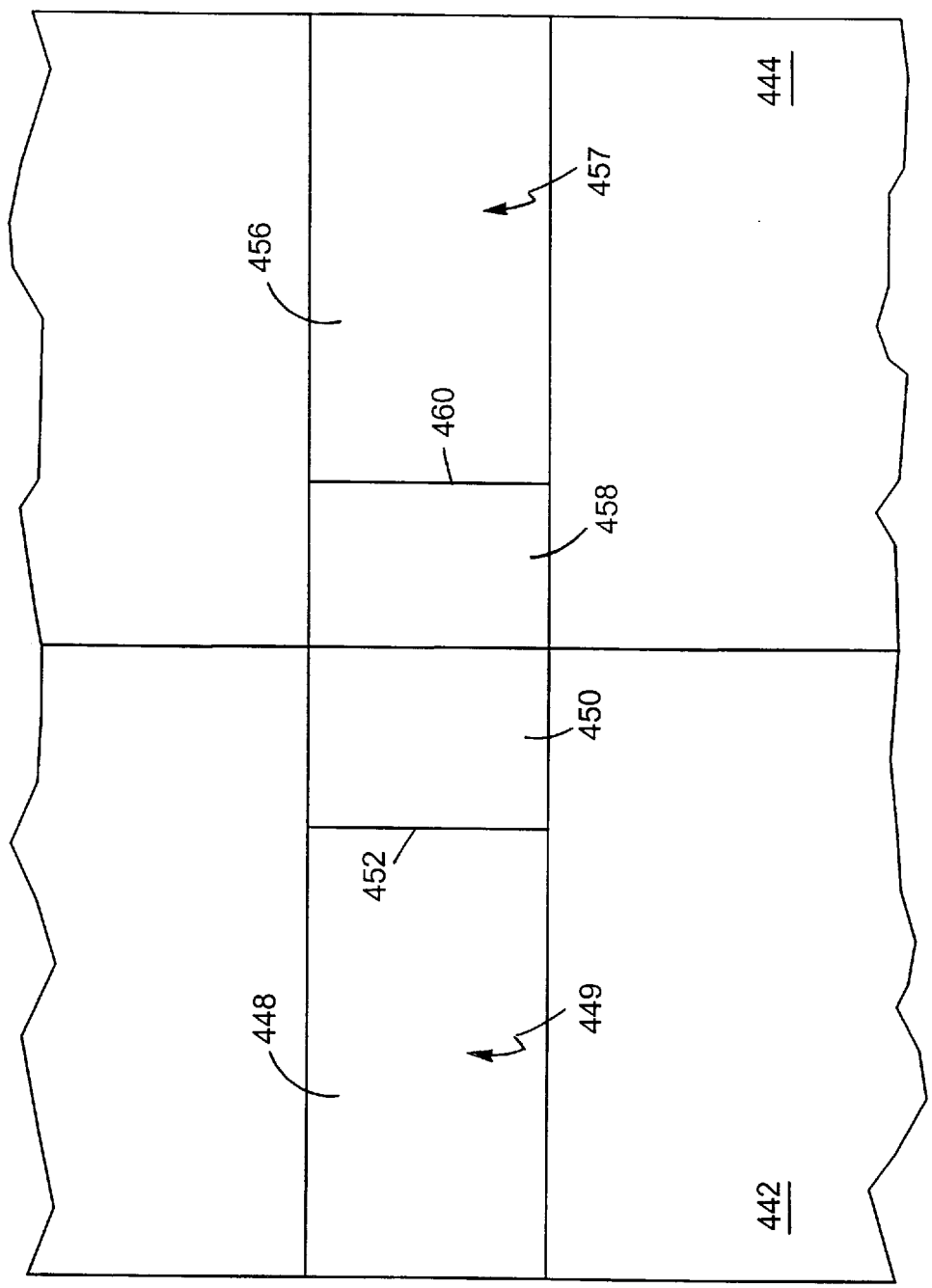

In order to form crisscrossed spike fasteners with a common base 406, the fasteners are fabricated using the molding plates illustrated in FIGS. 22A and 22B. FIG. 22A shows an end view of a pair of molding plates 440 which are used to form a crisscross spike fastener. FIG. 22B is a top view of FIG. 22A taken along line 22B—22B. Mold plates 442 and 444 each have respective mold surfaces 446 and 454 which define respective halves of mold cavity 441. Mold plate 442 has mold surface 446 which includes an upper area 448 and an extended lower area 450 which intersects the upper area 448 at junction edge 452. Similarly, mold plate 444 has mold surface 454 with an upper area 456 and an extended lower area 458 which intersects upper area 456 at junction edge 460. The lower area 458 preferably extends through the side edge of plate 444 at a through hole 459.

Mold surfaces 446 and 454 are preferably formed by laser drilling. The following description will be made with reference to mold plate 442 and mold surface 446, although those in the art will appreciate a similar description applies to mold plate 444. Upper area 448 of mold surface 446 is formed by drilling the top surface of mold plate 442 at an angle with a laser to create opening 449 and remove material from the mold plate 442. The mold plate 442 is then laser drilled at an angle in an opposite direction, preferably at the point 453 where the upper area 448 intersects the side edge 455 of the mold plate 442. This creates the lower area 450 of the mold surface 446 which extends away from edge 455 and also creates a junction edge 452 at the intersection with the upper mold surface area 448. Preferably, the lower area 450 is drilled through the side edge of the plate to create a through-hole 451. This allows easy access to the mold surface 446 for cleaning purposes. Through hole 459 provides similar cleaning access for mold plate 444. Cleaning of the mold surfaces 456 and 454 can therefore, be accomplished by poking through the holes 451 and 459 from the exterior of the mold plates.

Similar laser drilling of mold plate 444 forms the other half of mold cavity 441. Alignment of lower area 458 of mold plate 444 is preferably made with upper area 448 of mold plate 442. Likewise, upper area 456 of mold plate 444 is preferably aligned with lower area 450 of mold plate 442. Together, mold surfaces 446 and 454 cooperate to define mold cavity 441 which can be used with adaptations of the Fischer process described herein.

Figure 23A:
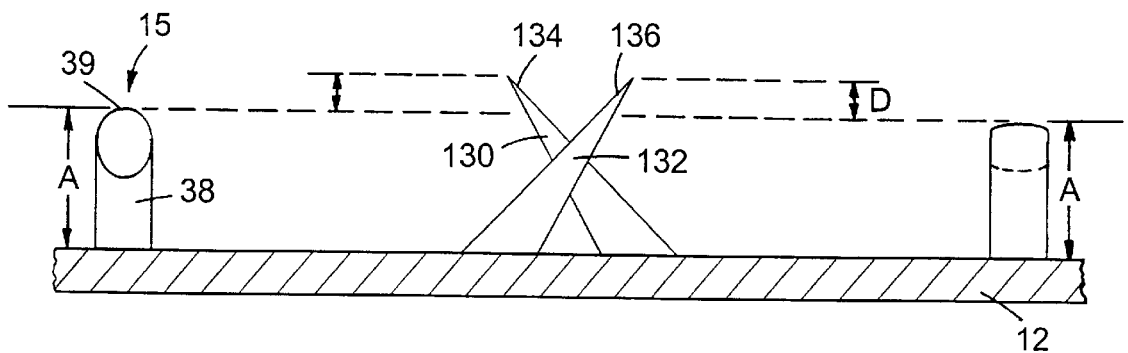
FIGS. 23A and 23B illustrate a post-forming process to produce spike elements with flattened tops.
Figure 23B:
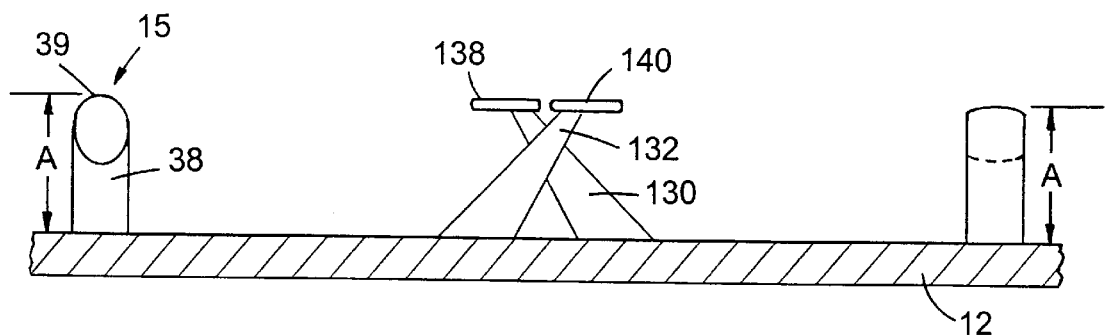

Referring to FIGS. 23A and 23B, there is shown an example of spike elements which undergo a post-forming thermo-mechanical process to produce flattened engagement tops. In a typical production run, some spike fastener elements 16 are produced, such as spikes 130 and 132, which have distal tips 134 and 136 that extend a distance D above a desired pre-established height A for the fastener elements. It is preferably desired to have all fastener elements, i.e., both hooks and spikes, be of approximate equal height for uniformity of engagement with a woven mating component in a given engagement plane. This allows the shear strength of the fastener-mating component engagement to be unidirectional.

In order to reduce distal tips 134 and 136 down to a height approximately equal to height A, the base sheet 12 with spike fasteners 130 and 132 are passed beneath a heated roll, such as roll 122 of FIG. 1, to deform the tops of the fasteners 130 and 132. This produces spike fastener element 130 with flattened top 138 and spike fastener element 132 with flattened top 140.

Many modifications and variations in the preferred embodiments will undoubtedly occur to those versed in the art, as will various other features and advantages not specifically enumerated, all of which may be achieved without departing from the spirit and scope of the invention as defined by the following claims.

What is claimed is:

1. A fastener for engaging loops, the fastener comprising:
   a base;
   a field of fastener elements molded with and extending from said base, said fastener elements constructed to engage loops of a mating loop component to form a releasable fastener, said fastener elements including
   hooks defining crooks for capturing loops, the crooks located at a height above the base; and
   spikes interspersed among and seperate from the hooks, said spikes extending at an acute angle from the base to at least the height of the crooks above the base.

2. The fastener of claim 1 wherein said fasteners are arranged in rows;
   a first set of said rows comprising said hooks; and
   a second set of said rows comprising said spikes.

3. The fastener of claim 1 wherein said spikes extend from a foundation to a distal tip, and said spikes taper from a radius of 0.002 inch at said tip to a radius of approximately 0.005 inch at said foundation.

4. The fastener of claim 3 wherein said spikes have a height of approximately 0.020 inch.

5. The fastener of claim 4 wherein said hooks have a height of approximately 0.020 inch.

6. The fastener of claim 1 wherein said spikes have a distal tip with a tip radius of 0.002 to 0.020 inch.

7. The fastener of claim 1 wherein said spikes have a base portion integrally molded with and extending from said base to a distal end; and
   a tip portion integrally molded with and extending from the distal end of said base portion.

8. The fastener of claim 7 wherein said base portion extends from said base at a first angle, and said tip portion extends from said distal end at a second angle.

9. The fastener of claim 1 wherein said hooks each have a single loop capturing crook.

10. The fastener of claim 1 wherein said hooks each has multiple loop-capturing crooks.

11. A fastener for engaging loops, the fastener comprising:
    a base;
    a field of fastener elements molded with and extending from said base, said fastener elements constructed to engage loops of a mating loop component to form a releasable fastener, said fastener elements including
    hooks defining crooks for capturing loops, said hooks extending in a first direction along the base; and
    spikes extending at an acute angle from the base and interspersed among and seperate from the hooks, said spikes extending in a second direction along the base.

12. The fastener of claim 11 wherein said first and second directions define therebetween an angle of at least 10 degrees.

13. The fastener of claim 12 wherein said angle is at least 30 degrees.

14. The fastener of claim 13 wherein said angle is approximately 90 degrees.

15. The fastener of claim 1 or 11 wherein said spikes are generally conical.

16. The fastener of claim 1 or 11 wherein said spikes have a central axis, and extend from said base at an angle of between about 30 and 60 degrees with respect to said central axis and said base.

17. The fastener of claim 1 or 11 wherein said spikes have a foundation and a distal tip with a tip radius of between 20 and 50% of the width of said foundation.

18. The fastener of claim 1 or 11 wherein said spikes outnumber said hooks.

19. A fastener for engaging loops, the fastener comprising:

a base;

a field of fastener elements molded with and extending from said base, said fastener elements constructed to engage loops of a mating loop component to form a releasable fastener, said fastener elements including hooks defining crooks for capturing loops, the crooks located at a height above the base; and spikes interspersed among, seperate from, and outnumbering the hooks, said spikes extending at an acute angle from the base to at least the height of the crooks above the base;

said field of fastener elements arranged in rows with a first set of rows comprising said hooks, and a second set of rows comprising said spikes;

said hooks having said crooks positioned in a direction parallel to said first set of rows;

said spikes positioned in a direction transverse to said second set of rows.

20. A fastener for engaging loops, the fastener comprising, a base;

a field of fastener elements molded with and extending from said base, said fastener elements, constructed to engage loops of a mating loop component to form a releasable fastener, said fastener elements including;

spikes extending at an acute angle from the base, said spikes having an engagement tip for capturing loops; and latch stems, seperate from said spikes, located on said base adjacent to said spikes and beneath said engagement tip, said latch stems cooperating with said spike to capture said loops.

21. A fastener for engaging loops, the fastener comprising, a base;

a field of fastener elements molded with and extending from said base, said fastener elements, constructed to engage loops of a mating loop component to form a releasable fastener, said fastener elements including;

pairs of adjacently opposed structures on said base, said pairs including a first structure and a second structure with an engagement tip for capturing loops, said engagement tip having a first position located above said first structure and a second position located beneath said first structure.

* * * * *